United States Patent [19]

Cheng

[11] Patent Number: 5,729,765
[45] Date of Patent: Mar. 17, 1998

[54] METHOD AND APPARATUS FOR DETERMINING THE STATUS OF A SHARED RESOURCE

[75] Inventor: Marco Y.C. Cheng, Fountain Valley, Calif.

[73] Assignee: Samsung Electronics Co., Ltd., Seoul, Rep. of Korea

[21] Appl. No.: 568,149

[22] Filed: Dec. 7, 1995

[51] Int. Cl.⁶ .................. G06F 1/12; G06F 5/06
[52] U.S. Cl. .................. 395/873; 395/551; 395/674; 395/880
[58] Field of Search .................. 395/250, 872, 395/873, 880, 672, 674, 551, 552, 553, 555, 556, 557

[56] References Cited

U.S. PATENT DOCUMENTS

| | | | |
|---|---|---|---|
| 4,821,220 | 4/1989 | Duisberg | 364/578 |
| 4,847,754 | 7/1989 | Obermarck et al. | 395/674 |
| 5,524,270 | 6/1996 | Haess et al. | 395/880 |

*Primary Examiner*—Jack B. Harvey
*Assistant Examiner*—Jeffrey K. Seto
*Attorney, Agent, or Firm*—Knobbe, Martens, Olson & Bear LLP.

[57] ABSTRACT

A method and apparatus for determining the status of a resource shared by multiple subsystems operating in mutually asynchronous clock domains apply a one-bit counter for each subsystem and synchronize the value of each such bit counter with all asynchronous clocks. Each subsystem exclusive-ORs the value of each bit counter to generate an availability status for the shared resource. System delays caused by synchronization are minimized, and circuit design and proof of correctness at the design stage are simplified.

13 Claims, 14 Drawing Sheets

P1_Test = (P1_Count + P2_Count ↑ P1) - (C1_Count ↑ P1 + C2_Count ↑ P1)

P1_Test = P1_Bitreg ⊕ (C1_Bitreg ↑ P1)
C1_Test = C1_Bitreg ⊕ (P1_Bitreg ↑ C1)

P1_Test = P1_Bitreg ⊕ (P2_Bitreg ↑ P1) ⊕ (C1_Bitreg ↑ P1) ⊕ (C2_Bitreg ↑ P1)

METHOD AND APPARATUS FOR DETERMINING THE STATUS OF A SHARED RESOURCE

BACKGROUND OF THE INVENTION

1. Field of the Invention

This invention relates to the field of digital systems and, more particularly, relates to a method for determining the status of a shared resource.

2. Description of the Related Art

In many digital systems, a single system resource must be shared by many components of the system. For example, in a digital computer system, it is common for a central processing unit (a "CPU") to share memory with a video display subsystem or even another CPU. Such a situation requires an arbitration scheme to decide which of potentially many requests for the resource will be granted. Further, when a single resource is used to pass information from one system component (a writing "producer") to another (a reading "consumer"), information stored in the resource by the producer must be protected until the consumer has retrieved the information. This is especially true when other producers are competing to write information to the same resource. Accordingly, once a producer writes information to a shared resource, other producers must then be prohibited from writing to the resource until the information is retrieved by a consumer.

A traditional circuit design for coordinating access to a shared system resource involves using a status register (or "semaphore") associated with the resource that represents full at one (high) logic state and represents empty at another (low) logic state. Such a semaphore is typically implemented using a standard flip-flop. A semaphore may be used, for example, to regulate information exchange through a shared resource capable of storing data. Such a semaphore would represent that the resource is full when "set" by a producer that has just written data into the resource (indicating that data can now be read by a consumer) and would represent that the resource is empty when "reset" by a consumer that has just read data from the resource (indicating that new data can now be written by a producer).

The semaphore scheme is satisfactory as long as all producers and consumers are operating within the same clock domain as a semaphore. In a uniform clock domain, producers and consumers can test the value of the semaphore without concern that an update signal in progress has not yet been received by the semaphore, or that an updated semaphore value has not yet propagated to all producers or consumers. In other words, in a uniform clock domain, there is no difficulty in guaranteeing that the value of a semaphore reflects the true status of a shared resource.

There is no need to synchronize signals between subsystems operating in a uniform clock domain. However, when two subsystems operate in different clock domains, signals from one to the other must be synchronized.

Accordingly, problems arise when subsystems share a resource but operate in different clock domains. Traditional semaphore schemes must overcome difficulties associated with a multiple clock domain, such as 1) which clock domain the semaphore will use; 2) how the set and reset signals are generated across differing clock domains; 3) when the value of the semaphore reflects the true status of a shared resource so that a subsystem can test such status; and 4) how the related design logic is tested for correctness at the design stage.

In a simple system involving one producer and one consumer which share a resource but operate in different clock domains, the traditional semaphore scheme allows three possible choices of a clock domain for the semaphore. First, the semaphore could be located in the producer's clock domain. In such a configuration, the producer has immediate synchronous access to the semaphore reflecting the status of the shared resource; thus, the producer's set signal is synchronous to the semaphore. However, the consumer's reset signal is not synchronous to the semaphore. Consequently, the consumer's reset signal must be synchronized to the producer's clock to update the semaphore, and the new value of the semaphore must be synchronized back to the consumer's clock domain to allow the consumer to test the status of the resource.

There is a delay associated with synchronizing the consumer's reset signal to the semaphore's (and producer's) clock domain and another delay associated with synchronizing the new value of the semaphore back into the consumer's clock domain. These delays create a window of time when the value of the semaphore, as tested by the consumer, is not valid (does not reflect the true status of the resource). If the consumer tests the semaphore during this window of time, the consumer will detect a set condition that is not valid. To prevent a consumer from prematurely testing the semaphore, the consumer must be delayed long enough to allow its own update signal to reset the semaphore and to also allow the semaphore's new reset value to reach the consumer.

A second choice of clock domains for the semaphore is to use the consumer's clock domain. Electing to use the consumer's clock domain presents a reverse scenario of the delay problem: the producer must be delayed long enough to prevent the producer from prematurely testing the semaphore to avoid the possibility of detecting an invalid reset status.

The third choice of clock domains for the semaphore is to use a third clock domain different from the clock domain of either the producer or consumer. In this case, both the producer and the consumer must be delayed from prematurely testing the semaphore. Thus, regardless of the choice of clock domain for the semaphore, either the producer, or the consumer, or both must be slowed by a delay to allow for synchronization.

Additional difficulties arise when more than one producer needs to write to the shared resource or more than one consumer needs to read from the shared resource. An arbiter element must be introduced which governs writes by producers and reads by consumers. The role of such an arbiter is to coordinate access rights among producers and consumers to avoid race conditions resulting from two or more producers writing simultaneously to a single resource or from two or more consumers reading simultaneously from a single resource. A traditional arbiter element receives multiple requests for a resource and grants access to only one requester who then becomes a current user. The arbiter will not grant another request for the resource until the current user releases it.

In a system containing multiple producers, an arbiter is needed to regulate producer write-access to a shared resource. In a system containing multiple consumers, an arbiter is needed to regulate consumer read-access to a shared resource. In a system containing multiple producers and multiple consumers, two arbiters are needed: one to regulate producers and another to regulate consumers.

In a multiple clock domain requiring arbitration, the synchronization problem becomes more complicated. When an arbiter finally grants a producer's or consumer's request to access the shared resource, the producer or consumer must ensure that the value of the semaphore reflects the true status of the resource.

To state the problem in more detail, assume that one producer finishes writing data to a shared resource, sends an update signal to set the semaphore and releases access rights to the shared resource. Assume also that the arbiter then detects the release of the resource and grants a second producer's access request. Meanwhile, the first producer's update signal, which may have to be synchronized with the semaphore's clock domain, will set the semaphore. The semaphore's value must eventually be synchronized with the second producer's clock to allow the second producer to validly test the status of the resource. At the time the arbiter granted the second producer's request for the resource, the semaphore's value, as tested by the second producer, may not reflect the true status of the shared resource if there has been insufficient time for the semaphore's value to be synchronized into the second producer's clock domain. The traditional solution to this problem, again, is to introduce a delay.

This timing problem has been solved by introducing a delay within the arbitration logic to ensure that the time between one producer's release of access and another producer's detection of a grant by the arbiter is at least as long as the time between one producer's issuance of an update signal to the semaphore and the eventual synchronization of the semaphore's newly updated value into another producer's clock domain. In systems comprising more than two producers or more than two consumers, the required arbitration delay must always be based on the slowest clock domain to ensure that the slowest producer or consumer does not prematurely test the status of a shared resource.

One disadvantage of the traditional arbitrated semaphore scheme is that system performance is degraded by the required delay. Given the growing emphasis on and need for high-speed computer systems, any degradation in system speed is a significant disadvantage.

Attempts have been made to optimize introduced delays, but such attempts, even when successful become inordinately complex and difficult to implement. Another disadvantage then of the traditional arbitrated semaphore scheme is that optimization of required delays is difficult to implement.

Another disadvantage of the arbitrated semaphore scheme is that substantial analysis is needed at the design stage to determine the shortest possible delay time needed to overcome a worst-case scenario. The complexity of the required analysis grows exponentially with the number of producers or consumers operating in different clock domains, and is further complicated when additional different clock domains comprise the semaphore or the arbiter or both.

Most importantly, however, is the disadvantage that arbitrated semaphore schemes are difficult to prove for correctness at the design stage. This problem is most appreciated in cases where the related logic is but one small component of a large-scale integrated circuit. Due to the great cost associated with tooling up for production of large-scale integrated circuits, great emphasis is placed on verifying the correctness of all logic at the design stage to avoid very costly mistakes.

SUMMARY OF THE INVENTION

The present invention is designed to reduce the complexity of logic required to determine the status of a shared resource and to improve the performance of such logic. More specifically, the present invention minimizes the time interval required to notify every resource-sharing subsystem of the availability or unavailability of a shared resource. The present invention advantageously avoids the use of a traditional semaphore to represent the status of a shared resource.

One aspect of the present invention is a one-bit binary counter (a bit register) for each resource-sharing subsystem. A subsystem toggles the value of its bit register each time it initiates an access to the shared resource. In this manner, each resource-sharing subsystem indicates each access it has initiated to the shared resource.

Another aspect of the present invention is the synchronization of the value of each bit register of each resource-sharing subsystem with all asynchronous clocks domains within which other resource-sharing subsystems operate. Because the value of each bit register of each resource-sharing subsystem is thus available to each subsystem, each subsystem can detect every access made to a shared resource.

A further aspect of the present invention is independent determination of the status of a shared resource by each resource-sharing subsystem. Each subsystem comprises logic to compare the values of each bit register of each resource-sharing subsystem. The result of such comparison comprises a status signal. Each subsystem thus derives its own status signal indicating the availability of a shared resource.

A still further aspect of the present invention is immediate, synchronous notification to a subsystem of changes in the status of a shared resource caused by that subsystem. Advantageously, each time a subsystem initiates an access to a shared resource, the accessing subsystem is immediately notified that the availability of the shared resource has changed.

Because the traditional semaphore is absent from the present invention, there is no asynchronous relationship between a semaphore and a resource-sharing subsystem requiring synchronization to and from the semaphore of every update signal generated by such an asynchronous subsystem. Consequently, there is no window of time during which a subsystem, after initiating an access to a shared resource, will not be able to detect the change in availability caused by its own access. Therefore, no additional delays need to be interposed to prevent a subsystem from prematurely accessing a shared resource, and, furthermore, delays related to accessing a shared resource in an asynchronous clock domain are minimized.

A method in accordance with the present invention determines the status of a resource of a digital system, wherein a first subsystem operating in synchronism with a first clock writes data to the resource, wherein a second subsystem operating in synchronism with a second clock reads data from the resource, wherein the second clock is asynchronous with respect to the first clock, and wherein the resource is unavailable for writing additional data from the first subsystem until previously written data is read from the resource by the second subsystem. The method comprises the steps of: generating a first quantity representing a number of write accesses to the resource made by the first subsystem, the first quantity generated in synchronism with said first clock; generating a second quantity representing a number of read accesses to the resource made by the second subsystem, the second quantity generated in synchronism with the second clock; synchronizing the first quantity with the second clock to generate a third quantity; synchronizing the second quantity with the first clock to generate a fourth quantity; comparing the first quantity to the fourth quantity to generate a first resource-available signal for the first subsystem, the first resource-available signal being active when the first quantity is equal to the fourth quantity, the first resource-available signal generated in synchronism with the first clock; and comparing the second quantity and the third quantity to generate a second resource-available signal for the second subsystem, the second resource-available signal being active when the second quantity is different from the third quantity, the second resource-available signal generated in synchronism with the second clock.

Another method in accordance with the present invention determines the status of a resource of a digital system, wherein at least one writing subsystem writes data to the resource, wherein at least one reading subsystem reads data from the resource, the resource being unavailable for writing additional data from the writing subsystems until previously written data is read from the resource by one of the reading subsystems, wherein each writing subsystem and each reading subsystem operate in synchronism with respective clocks, wherein at least one writing subsystem operates in synchronism with a first clock, and wherein at least one reading subsystem operates in synchronism with a second clock, the second clock being asynchronous with the first clock. The method comprises the steps of: generating one write quantity for each the writing subsystem, each write quantity representing a number of write accesses to the resource made by a respective the writing subsystem, each write quantity for each the writing subsystem generated in synchronism with the respective clock of the writing subsystem; generating one read quantity for each reading subsystem, each read quantity representing a number of read accesses to the resource made by a respective the reading subsystem, each read quantity for each reading subsystem generated in synchronism with the respective clock of the reading subsystem; synchronizing each write quantity with the clocks of writing subsystems and the clocks of reading subsystems; synchronizing each read quantity with the clocks of writing subsystems and the clocks of reading subsystems; summing the write quantities to generate a total write quantity, the summing performed independently by each writing subsystem and each reading subsystem; summing the read quantities to generate a total read quantity, the summing performed independently by each writing subsystem and each reading subsystem; comparing the total write quantity and the total read quantity to generate a resource-available-for-writing signal, the resource-available-for-writing signal being active when the total write quantity is equal to the total read quantity, the comparison performed independently by each writing subsystem to generate respective resource-available-for-writing signals; and comparing the total write quantity and the total read quantity to generate a resource-available-for-reading signal, the resource-available-for-reading signal being active when the total write quantity is different from the total read quantity, the comparison performed independently by each reading subsystem to generate respective resource-available-for-reading signals.

Another method in accordance with the present invention determines the status of a resource of a digital system, wherein a first subsystem operating in synchronism with a first clock makes primary accesses to the resource, wherein a second subsystem operating in synchronism with a second clock makes secondary accesses to the resource, the second clock being asynchronous with respect to the first clock, wherein the resource is not available for additional primary accesses until a the secondary access occurs, and wherein the resource is not available for secondary accesses until the primary access occurs, the primary accesses alternating in time with the secondary accesses. The method comprises the steps of: generating a first quantity representing a number of the primary accesses to the resource made by the first subsystem, the first quantity generated in synchronism with the first clock; generating a second quantity representing a number of the secondary accesses to the resource made by the second subsystem, the second quantity generated in synchronism with the second clock; synchronizing the first quantity with the second clock to generate a third quantity; synchronizing the second quantity with the first clock to generate a fourth quantity; comparing the first quantity to the fourth quantity to generate a first resource-available signal for the first subsystem, the first resource-available signal being active when the first quantity is equal to the fourth quantity, the first resource-available signal generated in synchronism with the first clock; and comparing the second quantity and the third quantity to generate a second resource-available signal for the second subsystem, the second resource-available signal being active when the second quantity is different from the third quantity, the second resource-available signal generated in synchronism with the second clock.

An apparatus in accordance with the present invention determines the status of a resource, wherein a writing subsystem sends a write signal to the resource, wherein a reading subsystem sends a read signal to the resource, wherein the writing subsystem operates in synchronism with a first clock, and wherein the reading subsystem operates in synchronism with a second clock, the second clock being asynchronous to the first clock. The apparatus comprises: a first semaphore element which generates a first update signal having a first logic state and a second logic state, the first semaphore element responsive to the write signal to change the logic state of the first update signal in synchronism with the first clock each time the writing subsystem writes data to the resource; a second semaphore element which generates a second update signal having a first logic state and a second logic state, the second semaphore element responsive to the read signal to change the logic state of the second update signal in synchronism with the second clock each time the reading subsystem reads data from the resource; a first synchronization element which synchronizes the first update signal with the second clock to generate a first synchronized update signal; a second synchronization element which synchronizes the second update signal with the first clock to generate a second synchronized update signal; a first test element which generates a first test output signal having a first logic state and a second logic state, the first test element generating the first test output signal at the first logic state when the first update signal is equal to the second synchronized update signal, the first test element generating the first test output signal at the second logic state when the first update signal is different from the second synchronized update signal; and a second test element which generates a second test output signal having a first logic state and a second logic state, the second test element generating the second test output signal at the first logic state when the first synchronized update signal is equal to the second update signal, the second test element generating the second test output signal at the second logic state when the first synchronized update signal is different from the second update signal.

Another apparatus in accordance with the present invention determines the status of a resource of a digital system, wherein a first subsystem operating in synchronism with a first clock writes data to the resource, and wherein a second subsystem operating in synchronism with a second clock reads data from the resource, the second clock being asynchronous with respect to the first clock, the resource being unavailable for writing additional data from the first subsystem until previously written data is read from the resource by the second subsystem. The apparatus comprises: means for generating a first quantity representing a number of write accesses to the resource made by the first subsystem, the first quantity generated in synchronism with the first clock; means for generating a second quantity representing a number of read accesses to the resource made by the second subsystem, the second quantity generated in synchronism with the second clock; means for synchronizing the first quantity with the second clock to generate a third quantity; means for synchronizing the second quantity with the first clock to generate a fourth quantity; means for comparing the first quantity to the fourth quantity to generate a first resource-available signal for the first subsystem, the first resource-available signal being active when the first quantity is equal to the fourth quantity, the first resource-available signal generated in synchronism with the first clock; and means for comparing the second quantity and the third quantity to generate a second resource-available signal for the second subsystem, the second resource-available signal being active when the second quantity is different from the third quantity, the second resource-available signal generated in synchronism with the second clock.

DETAILED DESCRIPTION OF THE PREFERRED EMBODIMENT

Figure 1:
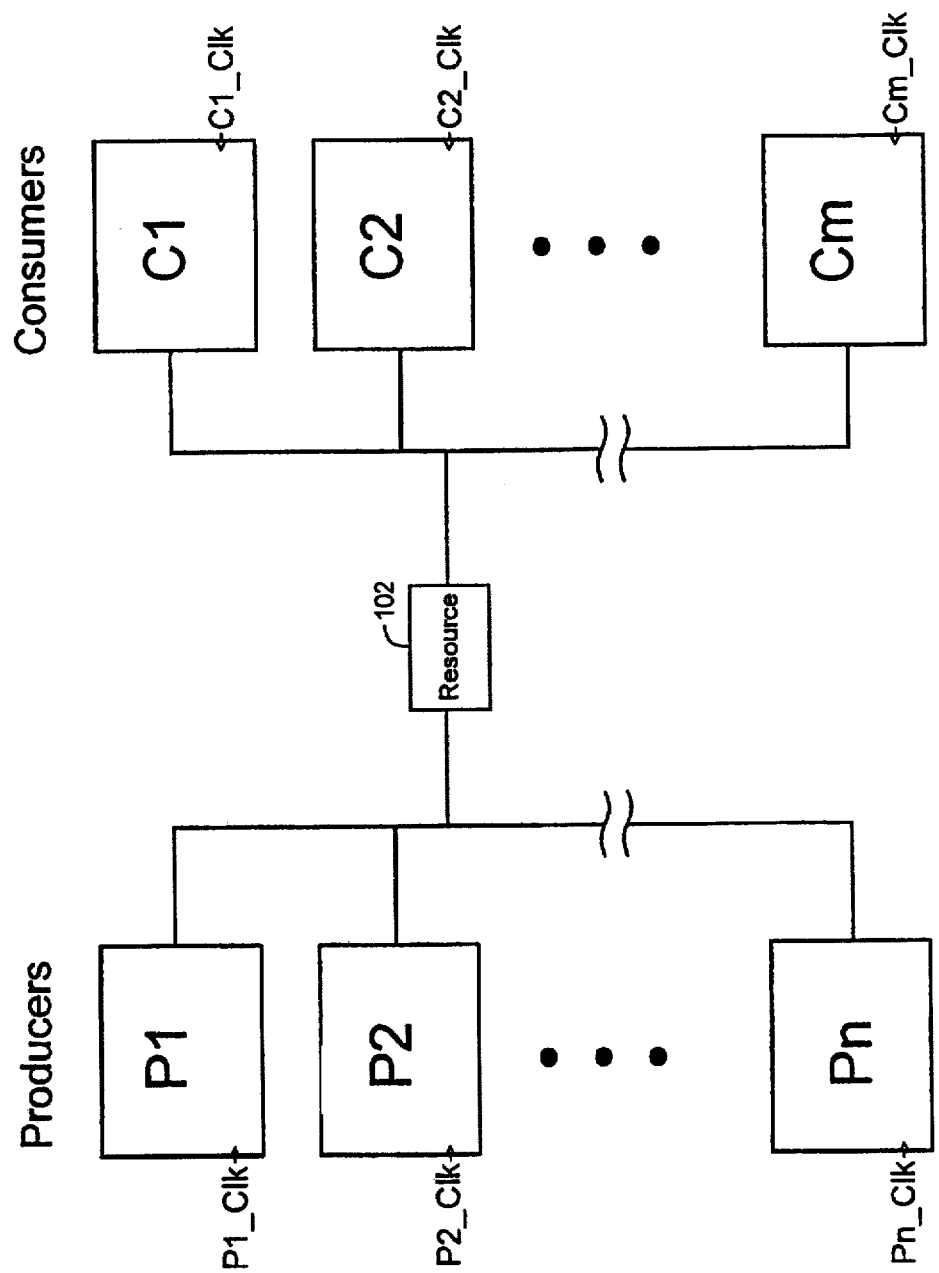
FIG. 1 is a block diagram illustrating a portion of a digital system comprising a multiplicity of producer subsystems and a multiplicity of consumer subsystems all operating in different clock domains sharing a common resource.

FIG. 1 is a simplified block diagram representing a multiplicity of subsystems in a computer system, wherein all subsystems can access a single, shared resource 102. The subsystems comprise "producers" and "consumers", each such producer capable of writing data to the resource 102; and each such consumer capable of reading data from the resource. Producer subsystems in FIG. 1 can provide information to consumer subsystems by writing data to the shared resource 102 which can then be read by a consumer. The shared resource 102 is capable of holding one data element.

Each producer and consumer subsystem illustrated in FIG. 1 operates in a different clock domain. It will be understood that a clock domain comprises one or more clocks operating with the same frequency and phase. It will be further understood that each of the systems described herein is initially reset to a known set of conditions. A reset is not shown in every figure; however, one skilled in the art will appreciate that a reset mechanism is provided for each system.

The present invention is directed toward determining the availability of a shared resource. Using the present invention, any number of producer subsystems or consumer subsystems, all operating in the same clock domain, in different clock domains, or any combination thereof, can determine whether a shared resource is available.

Figure 2:
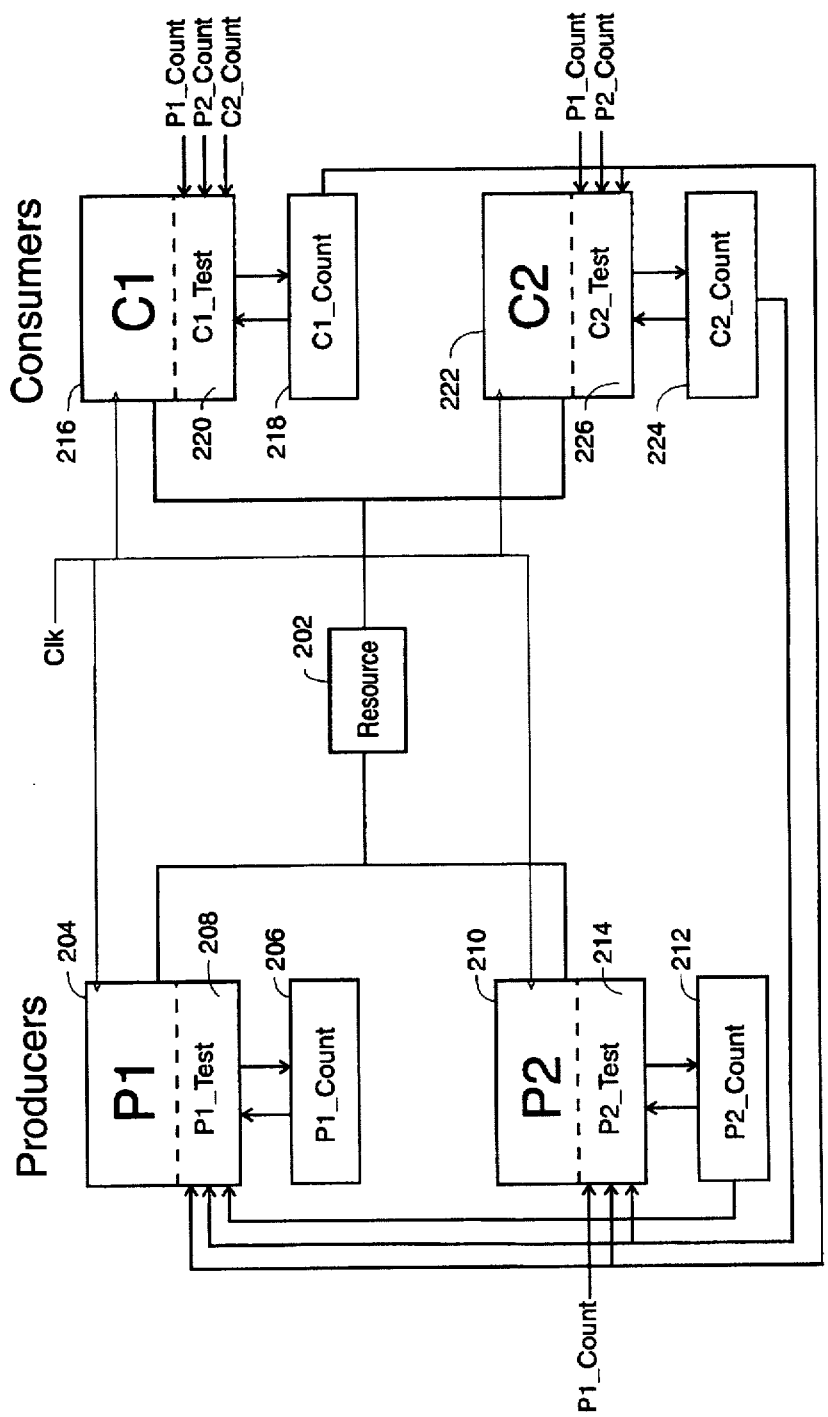
FIG. 2 is a block diagram illustrating two producer subsystems and two consumer subsystems, each producer and consumer comprising a counter and sharing a single resource in a computer environment where each producer and consumer is operating in the same clock domain.

FIG. 2 is a simplified block diagram of a portion of a digital system comprising two producer subsystems ("P1" and "P2") and two consumer subsystems ("C1" and "C2") sharing a resource 202 which is capable of holding one data element. Each producer and consumer has an associated counter element ("P1_Count," "P2_Count," "C1_Count," and "C2_Count"). Each counter element is capable of holding integer values beginning with zero, such values capable of being incremented by one.

A first producer 204 comprises a counter 206 and a testing logic component 208. The first producer 204 increments the counter 206 by one every time the first producer 204 writes data to the shared resource 202. A second producer 210 likewise comprises a counter 212 and a testing logic component 214. The second producer 210 increments the counter 212 by one every time the second producer 210 writes data to the shared resource 202.

A first consumer 216 comprises a counter 218 and a testing logic component 220. The first consumer 216 increments the counter 218 by one each time the first consumer 216 reads data from the shared resource 202. Similarly, a second consumer 222 comprises a counter 224 and a testing logic component 226. The second consumer 222 increments the counter 224 by one each time the second consumer reads data from the shared resource 202.

Both producers and both consumer can read the value of all four counters. Thus, for example, the value of the counter 206 of the first producer 204 can not only be read by the first producer 204, but can also be read by the second producer 210 as well as by the first consumer 216 and by the second consumer 222.

To avoid writing data to the shared resource 202 before previously written data has been read, a producer must be able to ascertain when it is permissible to write data to the shared resource. To ascertain when it is permissible to write data to the shared resource, a producer must check the status of the resource. If the resource contains data which has not yet been retrieved by a consumer (i.e., "fresh" data), a producer cannot place new data in the resource without destroying the prior intended communication.

A consumer must also check the status of the resource to determine whether the data inside the resource are old data that have already been read by a consumer (i.e., "stale" data) or are new data ready for reading. A consumer must avoid reading stale data and must ensure that any data read is fresh.

In the uniform clock environment illustrated in FIG. 2, the first producer 204 can ascertain when it is safe to write data to the shared resource 202 (i.e., when the resource contains stale data) by reading the values of all counters of all producers and consumers in the system. The testing logic component 208 of the first producer 204 sums the value of its own counter 206 and the value of the counter 212 of the second producer to generate a total number of writes to the shared resource 202. The testing logic component 208 of the first producer 204 also sums the value of the counter 218 of the first consumer and the value of the counter 224 of the second consumer to generate a total number of reads from the shared resource 202. The testing logic component 208 next subtracts the total number of reads from the total number of writes. A zero result indicates to the first producer 204 that it is safe to write data to the shared resource 202. A zero result indicates that every instance of a producer writing data to the shared resource is accompanied by a matching instance of a consumer reading data from the resource. Similarly, if the result of such subtraction is nonzero, the first producer 204 is able to discern that it is not safe to write data to the shared resource 202 (i.e., that fresh data exist in the resource which have not yet been read).

The testing logic required for the first producer 206 to test the status of the shared resource 202 can be represented in equation form:

$$P1\_Test=(P1\_Count+P2\_Count)-(C1\_Count+C2\_Count)$$

If the result of the P1_Test equation is zero, then stale data exist in the shared resource 202 and the first producer 204 may safely write new data to the shared resource 202. If the result of the P1_Test equation is nonzero, then fresh data exist in the shared resource 202, and the first producer 204 may not place new data in the resource 202.

Similar testing logic allows a consumer to discern when a shared resource is available for reading. The testing logic component 220 of the first consumer 216 will independently perform the same calculations performed by the testing logic component 208 of the first producer 204 described above. If the result is nonzero, then fresh data exist in the resource 202, and the first consumer 216 can read data from the shared resource 202. If the result is zero, then stale data exist in the resource 202 and the first consumer 216 may not read data.

The testing logic required for the consumer 216 to test the status of the shared resource 202 is the same testing logic as that required for the producer 206:

$$C1\_Test=(P1\_Count+P2\_Count)-(C1\_Count+C2\_Count)$$

If the result of the C1_Test equation is nonzero, then fresh data exist in the shared resource 202 and the first consumer 216 may safely read data from the shared resource 202. If the result of the C1_Test equation is zero, then stale data exist in the shared resource 202, and the first consumer 216 may not read data.

It will be understood that FIG. 2 is offered for theoretical purposes only. In practice, no integer counter is capable of infinite counting. Generally, such counters "wrap around" to a zero value when incremented beyond their capacity. The testing logic equations discussed in relation to FIG. 2 would fail any time one of the counters suddenly went from a very high number to zero. FIG. 2 is useful, however, to illustrate an underlying theory of the present invention: that the status of a shared resource can be determined by forcing each subsystem to represent its own history of accessing the resource and by next examining all such access histories of all subsystems.

Figure 3:
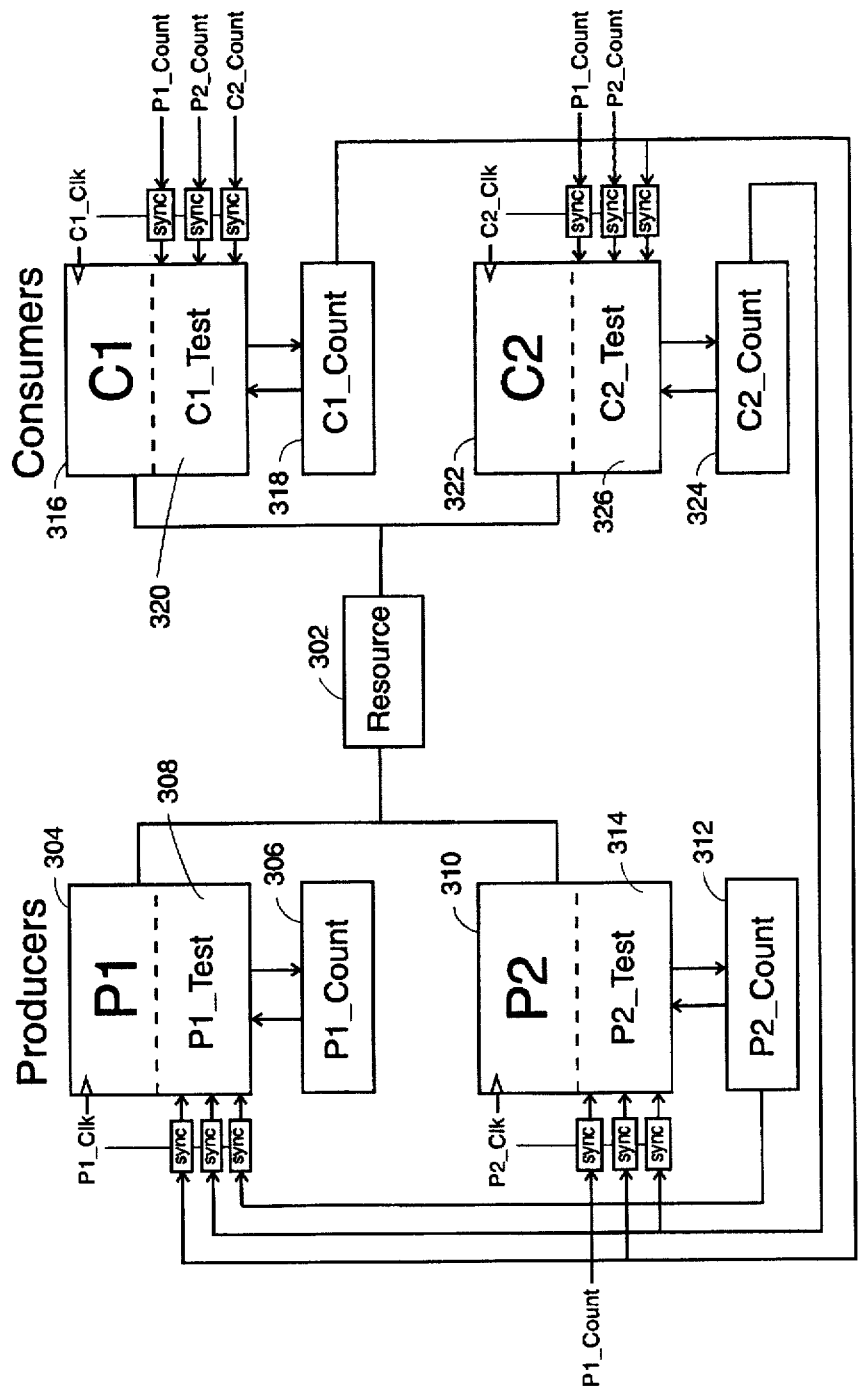
FIG. 3 is a block diagram illustrating two producer subsystems, two consumer subsystems, each subsystem comprising a counter, each subsystem sharing a resource, each producer and consumer operating in a different clock domain.

FIG. 3 is a simplified block diagram representing two producer subsystems ("P1" and "P2") and two consumer subsystems ("C1" and "C2"). The four subsystems all have access to a shared resource 302 capable of holding a single data element. Also, each producer and each consumer in the system illustrated in FIG. 3 operates in a different clock domain. In other words, there are four different clock domains illustrated in FIG. 3, one for each subsystem.

FIG. 3 represents a first producer 304 comprising a counter 306 and a testing logic component 308 and operates in synchronism with a first clock (P1_Clk). The first producer 304 increments the counter 306 by one every time the first producer 204 writes data to the shared resource 302. A second producer 310 likewise comprises a counter 312 and a testing logic component 314 and operates in synchronism with a second clock (P2_Clk). The second producer 310 increments the counter 312 by one every time the second producer 310 writes data to the shared resource 302.

A first consumer 316 comprises a counter 318 and a testing logic component 320, and operates in synchronism with a third clock (C1__Clk). The first consumer 316 increments the counter 318 by one each time the first consumer 316 reads data from the shared resource 302. Similarly, a second consumer 322 comprises a counter 324 and a testing logic component 326 and operates in synchronism with a fourth clock (C2__Clk). The second consumer 322 increments the counter 324 by one each time the second consumer reads data from the shared resource 302.

As was true for the system described in FIG. 2, the testing logic component enables each producer to determine whether it is safe to write data to the shared resource (detect whether data are "stale") and enables each consumer to determine whether it is safe to read data from the shared resource (detect whether data are "fresh"). However, the subsystems in FIG. 3 are operating in different clock domains; thus, before a testing logic component of a producer or consumer can use the values of counters associated with other subsystems, one skilled in the art will appreciate that such values must be synchronized to the clock of the testing logic component.

Accordingly, because the counter 306 is operating in the same clock domain as the first producer 304, the first producer 304 has immediate synchronous access to the value of the counter 306. The first producer 304 does not, however, have synchronous access to the value of the counter 312 of the second producer 310, to the value of the counter 318 of the first consumer 316, or to the value of the counter 324 of the second consumer 322. It will be understood that, to allow the first producer 304 to read the values of the counters 312, 318, and 324, each counter value must be synchronized with the clock of the producer, P1__Clk.

FIG. 3 illustrates synchronization of the values of counters 312, 318, and 324 with the clock, P1__Clk. Thus, the value of the counter 312 of the second producer 310 is input to a synchronization element clocked by P1__Clk. The synchronized value of the counter 312 is then propagated to the testing logic component 308 of the first producer 304. Likewise, the value of the counter 318 of the first consumer 316 is also input to a synchronization element clocked by P1__Clk. The synchronized value of the counter 318 is then propagated to the testing logic component 308 of the first producer 304. Also, the value of the counter 324 of the second consumer 322 is input to a synchronization element clocked by P1__Clk. The synchronized value of the counter 324 is then propagated to the testing logic component 308 of the first producer 304.

Once all counter values are synchronized with the clock domain of a producer or consumer, that producer or consumer can check the status of the shared resource 302. As described in relation to FIG. 2, the first producer 304 can check the status of the shared resource 302 by subtracting the sum of the values of the consumer counters (310, 312) from the sum of the values of the producer counters (304, 308).

The testing logic used by the first producer 304 to check the status of the shared resource 302 can be represented by the equation:

$$P1\_Test = (P1\_Count + P2\_Count \uparrow P1) - (C1\_Count \uparrow P1 + C2\_Count \uparrow P1)$$

Note that synchronization of P2__Count, C1__Count, and C2__Count with the clock, P1__Clk, of the producer 304 is indicated in the equation by the operational suffix "↑P1". As described in relation to FIG. 2, a zero result of the P1__Test equation indicates that stale data are in the resource 302, and the first producer 304 may then write new data to the resource 302. A nonzero value, on the other hand, indicates that fresh data are in the resource 302, and the producer 304 cannot write new data to the resource 302.

The testing logic used by the first consumer 316 is quite similar and can be represented by a similar equation. For example, the testing logic equation for the first consumer 316 is:

$$C1\_Test = (P1\_Count \uparrow C1 + P2\_Count \uparrow C1) - (C1\_Count + C2\_Count \uparrow C1)$$

Note that P1__Count, P2__Count, and C2__Count are all synchronized with the clock, C1__Clk, of the first consumer 316. If the result of the C1__Test equation is nonzero, the first consumer 316 can safely read data from the shared resource 302. If the result of the C1__Test equation is zero, the first consumer 316 cannot read data from the shared resource 302.

As was true with FIG. 2, FIG. 3 is useful only in theory. Because counters, in practice, cannot count infinitely high, the testing logic of FIG. 3 would fail if put to use.

Figure 4:
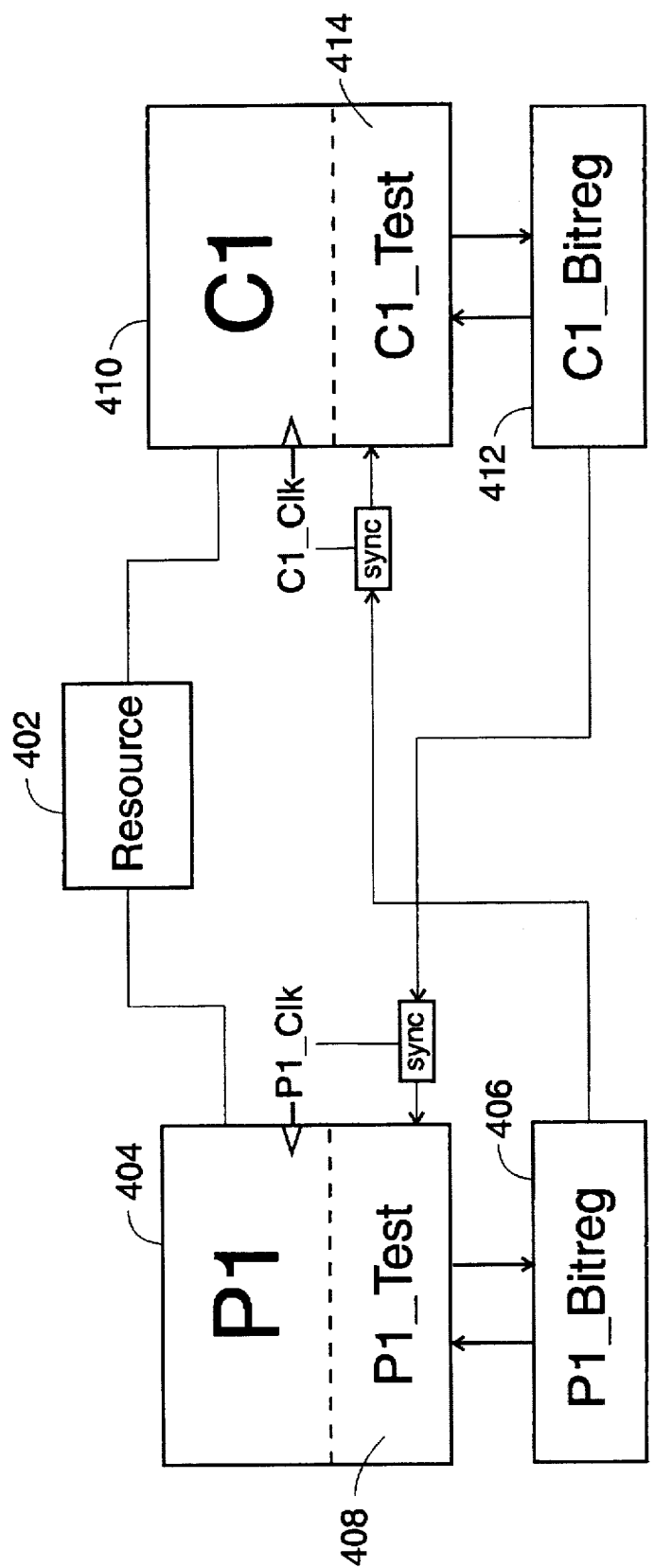
FIG. 4 is a block diagram of a portion of a digital system comprising one producer and one consumer sharing a resource, each comprising a bit register, and each operating in a different clock domain.

FIG. 4 is a simplified block diagram representing a portion of a digital system comprising one producer subsystem ("P1") and one consumer subsystem ("C1") operating in different clock domains. The producer and consumer subsystems share a resource 402 capable of holding a single data element.

As illustrated in FIG. 4, a producer subsystem 404 comprises a bit register 406 and a testing logic component 408 and operates in synchronism with a first clock (P1__Clk). A consumer subsystem 410 comprises a bit register 412 and testing logic component 414 and operates in synchronism with a second clock (C1__Clk). Each bit register (406, 412) is capable of representing a value of zero or one.

The producer 404 can read the value of the bit register 412 of the consumer 410, and the consumer 410 can read the value of the bit register 406 of the producer 404. However, the producer 404 and the consumer 410 are operating in asynchronous clock domains. Therefore the value of the bit register 412 must be synchronized with the clock, P1__Clk of the producer 404, and the value of the bit register 406 must be synchronized with the clock, C1__Clk, of the consumer 410. Accordingly, FIG. 4 illustrates the value of the bit register 412 being propagated as an input to a synchronization element clocked by P1__Clk. The synchronized value of the bit register 412 is then propagated to the testing logic component 408 of the producer 404. Also, the value of the bit register 406 is propagated as an input to a synchronization element clocked by C1__Clk. The synchronized value of the bit register 406 is then propagated to the testing logic component 414 of the consumer 410.

The present invention is concerned with comparing the number of times producers have written data to a shared resource (number of "writes") with the number of times consumers have read data from the same shared resource (number of "reads"). For purposes of the present invention, the status of the shared resource can be checked by ascertaining whether the number of writes is the same or different from the number of reads; that is to say that calculating the actual number of writes or reads is not required to check the status of the shared resource.

The testing logic described above in association with FIGS. 2 and 3 can therefore be simplified. Because the shared resource 402 is capable of holding only one data element and because only a zero or nonzero restfit is required to represent the status of the shared resource, one skilled in the art will understand that binary bit registers may be substituted for the counters described above with respect to FIGS. 2 and 3. Further, one skilled in the art will also appreciate that, for the same reasons, the Boolean algebra operation "exclusive-OR" can be substituted in place of the addition and subtraction discussed above with regard to FIGS. 2 and 3.

The exclusive-OR operation is well-known in the art. The exclusive-OR operator applied to two binary operands will result in a high state output when one binary operand is in a high state and the other is in a low state. The exclusive-OR operation will result in a low state output when both binary operands are in a high state or when both binary operands are in a low state.

It will be readily apparent that the exclusive-OR operation is ideally suited for comparing a number of writes against a number of reads (each such write or read being indicated by a producer or consumer changing the value of its respective binary bit register) to determine whether or not the number of writes matches the number of reads. The present invention is directed to a strictly enforced write-read-write-read access strategy and absolutely prohibits two or more writes without an intervening read as well as two or more reads without an intervening write. In the context of a system employing such an access strategy, the exclusive-OR operation applied to each and every bit register as a binary operand will yield zero when the number of writes matches the number of reads and will yield one when the numbers differ.

The producer 404 and the consumer 410 thus comprise binary bit registers (406, 412) in place of integer counters as described in FIGS. 2 and 3. The producer 404 can ascertain whether stale data exist in the shared resource 402 by exclusive-ORing the value of its own bit register 406 and the value of the bit register 412 of the consumer 410. Such exclusive-OR operation is carried out in the testing logic component 408 of the producer 404. If the result obtained by exclusive-ORing the value of both bit registers (406, 412) is zero, then stale data exist, and the producer 404 may write data to the shared resource 402. If the result is one, however, then fresh data occupy the shared resource 402, and the producer 404 may not write new data to the shared resource 402.

To illustrate the required testing logic, the producer 404 can ascertain the status of the shared resource 402 according to the following equation:

$$P1\_Test = P1\_Bitreg \oplus P2\_Bitreg \uparrow P1 \oplus C1\_Bitreg \uparrow P1 \oplus C2\_Bitreg \uparrow P1$$

Note that the exclusive-OR operation is indicated in the above equation by the "$\oplus$" operator. If the result of the P1_Test equation is zero, then any data in the shared resource 402 has already been read by the consumer 410 (the data are stale), and the producer 404 can write new data to the shared resource 404. If the result of the P1_Test equation is one, however, then fresh data exist in the shared resource 402 and the producer 404 may not write new data to the shared resource 402.

The same testing logic is used by the consumer 410. For example, the consumer 410 can ascertain the status of the shared resource 402 according to the following equation:

$$C1\_Test = C1\_Bitreg \oplus P1\_Bitreg \uparrow P1 \oplus P2\_Bitreg \uparrow P1 \oplus C2\_Bitreg \uparrow P1$$

If the result of the C1_Test equation is one, then fresh data exist in the shared resource 402 and the data can be immediately read by the consumer 410. If, on the other hand, the result of the C1_Test equation is zero, then the data in the shared resource 402 are stale and the consumer 410 may not read the data.

FIG. 5 is a logic diagram representing logic which allows one producer subsystem and one consumer subsystem to independently test the status of a shared resource. The shared resource is not shown in FIG. 5. Also, the producer and consumer subsystems are not shown in their entirety; rather, FIG. 5 illustrates only components which facilitate the bit register and the testing logic components described generally in relation to FIG. 4. The bit register function allows a producer to indicate that it has written data to a shared resource and allows a consumer to indicate that it has read data from a shared resource. The testing logic component allows a consumer or a producer to test the status of the shared resource.

Figure 5A:
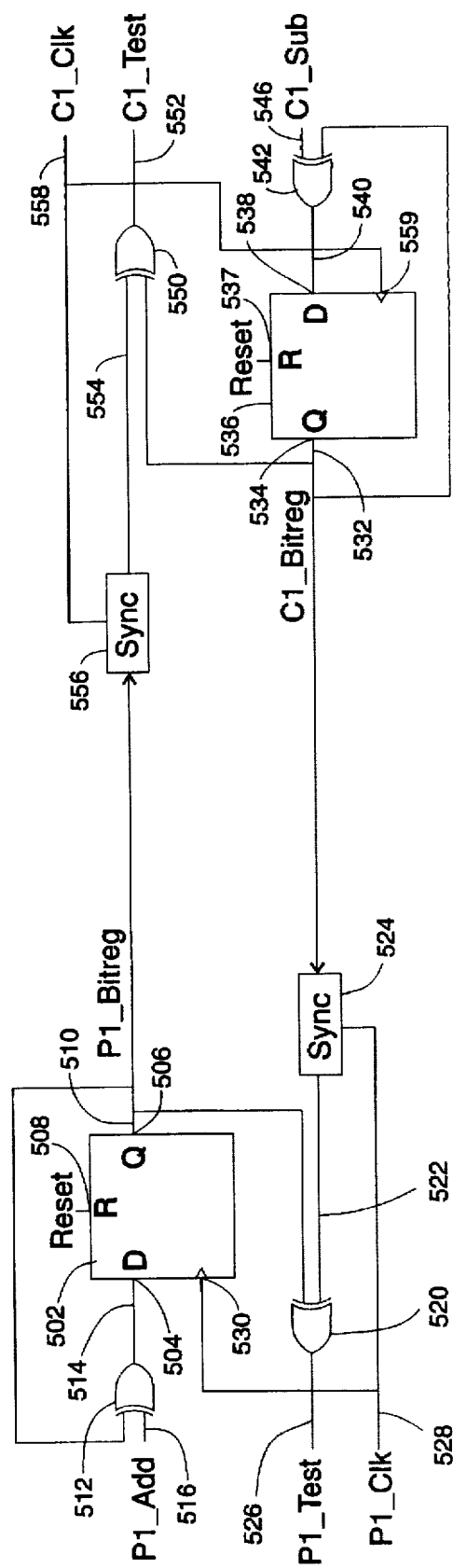
FIG. 5a is a logic diagram illustrating respective bit register components and resource testing components for one producer subsystem and one consumer subsystem, each subsystem operating in a different clock domain.

As represented in FIG. 5a, a first D flip-flop 502 has a D input 504, a Q output 506, and a reset (R) input 508. The Q output 506 is connected by a line 510 to a first input of an exclusive-OR gate 512. The exclusive-OR gate 512 has an output connected by a line 514 to the D input 504. A second input to the exclusive-OR gate 512 is connected by a line 516 to a P1_Add signal generated by a producer subsystem 404 (FIG. 4). The Q output 506 is connected by the line 510 to a first input of a second exclusive-OR gate 520. A second input to the exclusive-OR gate 520 is connected by a line 522 to an output of a synchronization element 524. An output of the exclusive-OR gate 520 is connected by a line 526 as a P1_Test input to the producer 404. The synchronization element 524 is connected by a line 528 to a first clock (P1_Clk). The clock P1_Clk is also connected by the line 528 to a clock input 530 of the D flip-flop 502.

An input to the synchronization element 524 is connected by a line 532 to a Q output 534 of a second D flip-flop 536. The D flip-flop 536 has a reset (R) input 537 and a D input 538. The D input 538 of D flip-flop 536 is connected by a line 540 to an output of a third exclusive-OR gate 542. The Q output 534 of the D flip-flop 536 is connected by the line 532 as a first input to the exclusive-OR gate 542. A second input of the exclusive-OR gate 542 is connected by a line 546 to receive a C1_Sub signal from a consumer subsystem 406 (FIG. 4). The Q output 534 of the D flip-flop 536 is connected by a line 532 as a first input to a fourth exclusive-OR gate 550. An output of the exclusive-OR gate 550 is connected by a line 552 as a C1_Test signal to the consumer subsystem 406. A second input to the exclusive-OR gate 550 is connected by a line 554 to the output of a synchronization element 556. The synchronization element 556 is connected by a line 558 to a second clock (C1_Clk). The clock C1_Clk is also connected by the line 558 to a clock input 559 of the D flip-flop 536. An input to the synchronization element 556 is connected by a line 510 to the Q output 506 of the D flip-flop 502. The reset (R) inputs 508, 537 are connected to a system reset line (not shown).

The operation of D flip-flops is well known in the art and will not be described in detail herein. Essentially, a D flip-flop has only one binary input signal and one binary output signal. The operation of a D flip-flop is synchronized with an input clock signal. The binary output signal of a D flip-flop will assume the state (high or low) of the binary input signal upon occurrence of a specified transition of a clock pulse.

As discussed above in relation to FIG. 4, a producer can indicate a write of data to a shared resource by changing the value of an associated bit register. Similarly, a consumer can indicate a read from a shared resource by changing the value of an associated bit register. Such a bit register continuously represents a high or low state and alternates its represented state (i.e., from low to high or from high to low) each time a certain signal is detected. One such bit register is illustrated in FIG. 5 as comprising the exclusive-OR gate 512 and the D flip-flop 502.

The logic state of the Q output 506 of the D flip-flop 502 is initially low, as is the signal on the line 516 generated by the producer; thus, the logic state of the output of the exclusive-OR gate 512 is initially low. When the producer writes new data to a shared resource, the producer initiates the write operation by generating a high pulse (a P1_Add) signal propagated by the line 516. The output of the exclusive-OR gate 512 assumes a high logic state for the duration of the P1_Add signal, and the high logic state is propagated by the line 514 to the D input 504 of the D flip-flop 502. On the arrival of the next positive edge transition generated by the producer subsystem's clock, P1_Clk, the Q output 506 of the D flip-flop 502 assumes a high logic state. One skilled in the art will appreciate that the duration of the P1_Add signal is approximately one period of the producer's clock, P1_Clk, providing sufficient setup and hold time to generate a valid signal at the D-input 504 of the D flip-flop 502.

The logic state of the Q output 506 of the D flip-flop 502 is then propagated by the line 510 as an input into the exclusive-OR gate 512. If the P1_Add signal is still high when the Q output signal 506 arrives at the exclusive-OR gate 512, the output of the exclusive-OR gate 512 temporarily assumes a low logic state. However, it will be understood that by the time the next positive edge transition generated by P1_Clk arrives, the P1_Add signal will have dropped to a low state, and the output of the exclusive-OR gate 512 thus assumes a high logic state. Thus, because a high logic state is presented to the D input 504 by the line 514, the logic state of the Q output 506 of the D flip-flop 502 consequently remains high.

When the producer subsystem next writes data to the shared resource, the producer generates another active P1_Add signal on the line 516 as an input into the exclusive-OR gate 512. The line 510, however, still has a high logic state which represents the second input into the exclusive-OR gate 512. Thus, because both of its inputs are high, the output of the exclusive-OR gate 512 assumes a low logic state. Consequently, the line 514 presents a low logic state to the D input 504 of the D flip-flop 502. It will be understood that, upon the arrival of the next positive transition generated by the producer subsystem's clock, P1_Clk, the Q output 506 assumes the low logic state of the D input 504. As described above, the line 510 propagates the low logic state of the Q output 506 as an input to the exclusive-OR gate 512. When the P1_Add signal drops low on or before the next clock cycle, both inputs to the exclusive-OR gate 512 represent a low logic state, causing the output of the exclusive-OR gate 512 have a low logic state. The line 514 thus presents a low logic state to the D input 504 of the D flip-flop 502. On the arrival of the next positive transition generated by the producer's clock, the Q output 506 of the D flip-flop 502 assumes the logic state of the D input 504 and, therefore, remains low.

In the manner described above, the exclusive-OR gate 512 and the D flip-flop 502 operate together as a bit register (or single bit counter) which alternates logic states from high to low or low to high (i.e., toggles) each time the producer generates an active P1_Add signal on the line 516. The bit register maintains a continuous logic state (P1_Bitreg) on line 510 between such pulses.

A bit register for a consumer subsystem comprises similar logic as described above. Each time the consumer subsystem reads data from a shared resource, the consumer generates an active high pulse on the C1_Sub signal line 546. The C1_Sub signal is propagated by the line 546 as an input to the exclusive-OR gate 542. It will be appreciated that, because the Q output 534 of D flip-flop 536 is propagated by the line 532 as the second input into the exclusive-OR gate 542, the active high C1_Sub signal causes the exclusive-OR gate 542 to output a logic state opposite to the logic state of the Q output 534. The opposite logic state is presented to the D input 538 by the line 540. Then, upon the next clock transition generated by the consumer's clock, C1_Clk, the Q output 534 assumes the logic state of the D input 538. Thus, the exclusive-OR gate 542 and the D flip-flop 536 comprise a bit register (or single bit counter) which changes its logic state (i.e., toggles) each time the consumer subsystem generates an active high C1_Sub signal on the line 546. The logic state of the consumer's bit register (C1_Bitreg) is maintained on the line 532 as the C1_Test signal.

As discussed generally in relation to FIG. 4, a producer can test the availability of a shared resource by comparing the value of a consumer's bit register to the value of its own bit register. As was described, such a comparison is preferably carried out by an exclusive-OR operation. The same testing logic allows a consumer to determine the availability of a shared resource.

Accordingly, the producer 404 can test the availability of a shared resource by exclusive-ORing the value of its bit register with the value of the consumer's 406 bit register. The value of the producer's bit register is represented by the logic state of the P1_Bitreg signal on the line 510. The P1_Bitreg signal on the line 510 is input into the exclusive-OR gate 520. It will be understood that, because the P1_Bitreg signal is synchronous with the producer's clock, P1_Clk, any change to the P1_Bitreg signal caused by the producer generating a P1_Add signal propagates to the exclusive-OR gate 520 within one clock cycle of the producer's clock and will be stable prior to the beginning of the next clock cycle generated by the producer's clock.

The value of the consumer's bit register, represented by the logic state C1_Bitreg, is, however, asynchronous to the producer's clock and must, therefore, be synchronized. The C1_Bitreg signal is thus propagated by the line 532 as an input to the synchronization element 524 which is clocked by P1_Clk.

Figure 5B:
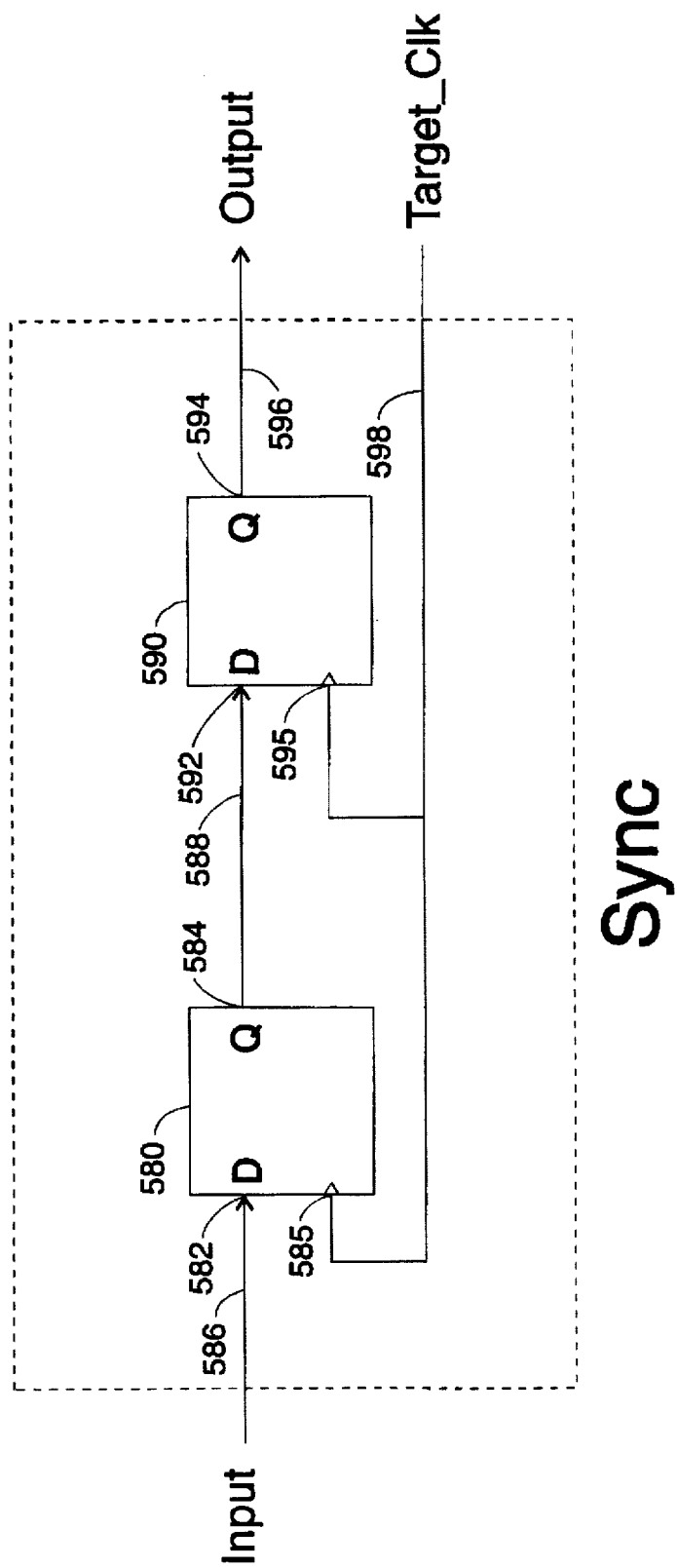
FIG. 5b is a logic diagram illustrating a synchronization element comprising two D flip-flops clocked by a common clock.

FIG. 5b is a logic diagram representing a synchronization element. A first D flip-flop 580 has a D input 582, a Q output 584, and a clock input 585. An input signal (Input) is connected by a line 586 to the D input 582. The Q output 584 is connected by a line 588 to a second D flip-flop 590 having a D input 592, a Q output 594, and a clock input 595. The Q output 594 is represented by an output signal (Output) and is propagated by a line 596. A target clock (Target_Clk) is connected by a line 598 to the clock input 585 of the first D flip-flop 580. The line 598 also connects the target clock to the clock input 595 of the second D flip-flop 590.

The Input signal is propagated by the line 586 to the D input 582. On the next positive transition generated by the Target_Clk, the D flip-flip 580 causes the Q output 584 to assume the logic state of the Input. The Q output 584 is propagated by the line 588 to the D input 592 of the D flip-flop 590. The next positive edge transition generated by Target_Clk causes the Q output 594 to assume the logic state carried by line 588. The line 596 propagates the Q output 594 as the Output signal, which is the logic state of the Input signal synchronized to Target_Clk. The synchronization element represented in FIG. 5b is only one example of logic which will accept a signal generated in synchronism with a first clock and synchronize such signal with a second clock which is asynchronous with the first clock.

With respect to FIG. 5a, the synchronization element 524, clocked by the producer's clock, P1_Clk, synchronizes the C1_Bitreg signal with the producer's clock. The synchronized $C1_{13}$Bitreg signal is propagated by the line 522 to the input of the exclusive-OR gate 520. The output of the exclusive-OR gate 520 on the line 526, comprises the test signal, P1_Test. When the logic state of P1_Bitreg is equal to the logic state of C1_Bitreg (i.e., when the number of writes to the shared resource is equal to the number of reads from the shared resource), then the logic state of P1_Test is low. Accordingly, when P1_Test is low, the shared resource 402 (FIG. 4) is available to the producer 404 to write new data. On the other hand, when P1_Test is high (i.e., when the number of writes to the shared resource is not equal to the number of reads from the shared resource), the shared resource is not available to the producer for writing.

A significant advantage of the present invention results from the fact that the value of the producer's bit register, P1_Bitreg, is generated and is available in synchronism with the producer's clock, P1_Clk. As such, after the producer indicates that it has written data to a shared resource by generating a P1_Add signal on line 516, the producer is immediately notified by the test signal, P1_Test, that the shared resource is no longer available. It will be appreciated that the present invention guarantees that a producer will not initiate a premature write operation to a shared resource and, advantageously, avoids the need to introduce a delay. The guarantee is based on the fact that, after a producer sends a first synchronous pulse (P1_Add) indicating that it has initiated a write operation to the shared resource, the P1_Bitreg signal immediately updates the P1_Test signal to show unavailability of the shared resource by the very next clock cycle.

Similar logic represented in FIG. 5a allows a consumer to test the status of a shared resource. The value of the consumer's bit register, C1_Bitreg, is synchronously available to the consumer on the line 532. Line 532 carries the C1_Bitreg logic state as an input to the exclusive-OR gate 550. The value of the producer's bit register, P1_Bitreg, is asynchronous to the consumer's clock and is consequently input into the synchronization element 556. The synchronization element 556 synchronizes P1_Bitreg with the consumer's clock, C1_Clk, and the synchronized value of P1_Bitreg is propagated by the line 554 to the second input of the exclusive-OR gate 550. The output of the exclusive-OR gate 550 on the line 552 is the test signal C1_Test. When $C1_{13}$ Test is high (i.e., when the number of writes to the shared resource 402 is different from the number of reads to the shared resource 402), the consumer can read from the shared resource 402. On the other hand, when C1_test is low, (i.e., when the number of writes to the shared resource 402 is equal to the number of reads from the shared resource), the consumer cannot read from the shared resource 402.

The advantages described above apply also to the consumer subsystem. When the consumer generates a C1_Sub signal, indicating that it has initiated a read operation, the consumer is notified immediately (within one clock cycle) that the shared resource 402 is no longer available for reading. The consumer is thereby prevented from prematurely reading the shared resource 402, and again, no delay is needed.

A reset signal (not shown) connected to the reset (R) inputs 508, 537 allows the value of both the producer's bit register, P1_Bitreg, and the consumer's bit register, C1_Bitreg, to be set to a low logic state. Such a reset capability is useful, for example, when a system comprising producer subsystems and consumer subsystems is halted and restarted. It will be understood that such a reset, in the context of producer and consumer subsystems, restores an initial condition of a shared resource being available for writing.

Figure 6:
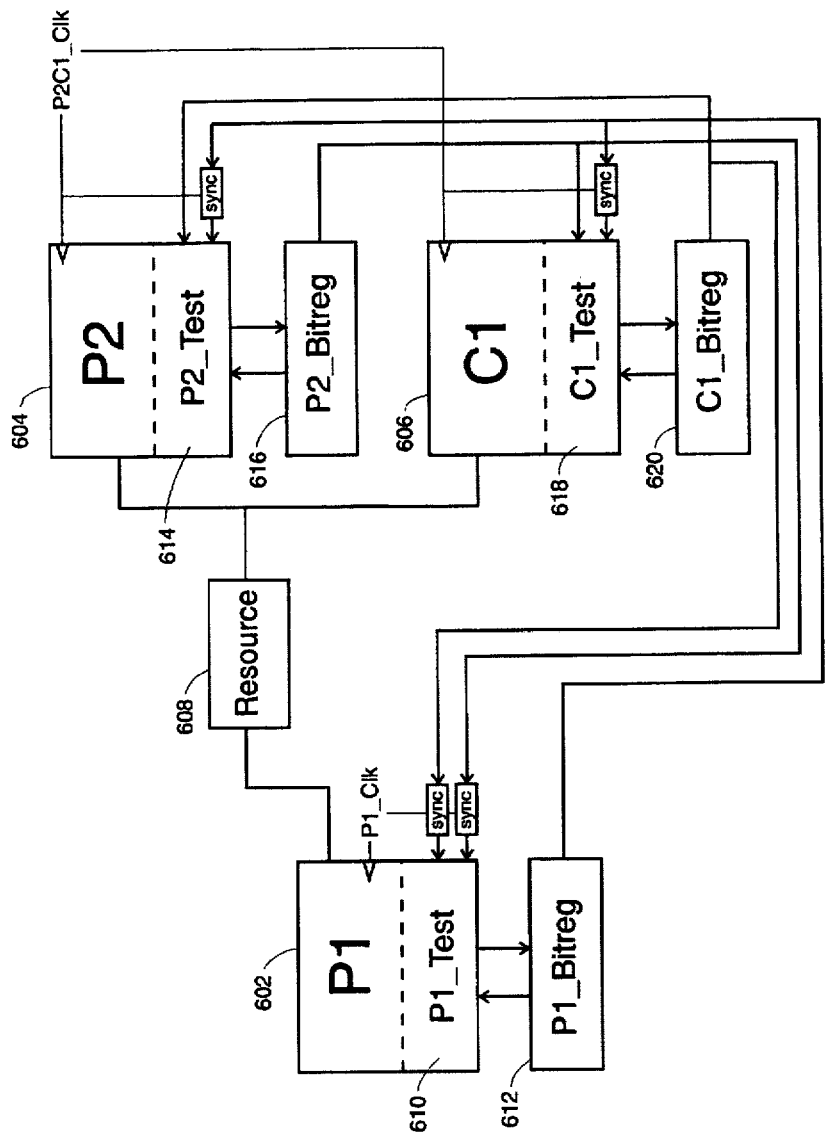
FIG. 6 is a block diagram representing a portion of a digital system comprising two clock domains, the first clock domain containing one producer subsystem, the second clock domain comprising one producer subsystem and one consumer subsystem, each subsystem comprising a bit register, and each subsystem sharing a resource.

FIG. 6 is a simplified block diagram representing a portion of a digital system comprising a first producer subsystem 602 operating in synchronism with a first clock (P1_Clk), a second producer subsystem 604 operating in synchronism with a second clock (P2C1_Clk), and a consumer subsystem 606 operating in synchronism with the second clock $P2C1_{13}$ Clk. P1_Clk is asynchronous with P2C1_Clk.

The first producer 602 comprises a testing logic component 610 and a bit register 612. The second producer 604 comprises a testing logic component 614 and a bit register 616. The consumer 606 comprises a testing logic component 618 and a bit register 620.

The three subsystems 602, 604, and 606 share a resource 608. The testing logic components 610, 614, and 618 allow the respective subsystems 602, 604, and 606 to independently determine the status of the shared resource 608. Each of the bit registers 612, 616, and 620 can represent a value of zero or one. Each of the subsystems 602, 604, and 606 can read the value of each of the bit registers 612, 616, and 620.

The value of the bit register 612 of the first producer 602 is asynchronous with P2C1_Clk and must therefore be synchronized with P2C1_Clk before the second producer 604 and the consumer 606 can perform comparisons using the value of the bit register 612. FIG. 6 thus represents the value of the bit register 612 being propagated into synchronization elements clocked by P2C1_Clk before being propagated ultimately into the testing logic components 614 and 618 of the second producer 604 and the consumer 620 respectively.

Similarly, the value of the bit registers 616 of the second producer 604 and the value of the bit register 620 of the consumer 606 are asynchronous with P1_Clk and must be synchronized with P1_Clk before the first producer 602 can use the values in comparisons. Accordingly, FIG. 6 represents the values of the bit registers 616 and 620 being propagated into synchronization elements clocked by P1_Clk before finally being propagated into the testing logic component 610 of the first producer 602.

The first producer 602 can ascertain whether stale data exist in the shared resource 608 by exclusive-ORing the value of the bit register 616 of the second producer 604, the value of the bit register 620 of the consumer 606, and the value of its own bit register 612. Such an exclusive-OR operation is carried out in the testing logic component 610 of the first producer 602. If the result obtained by such exclusive-ORing is zero, then stale data exists in the shared resource 608 and the first producer 602 may write data to the shared resource 608. If, on the other hand, the result of such exclusive-ORing operation is one, then fresh data occupy the shared resource 608, and the first producer 602 may not write new data to the shared resource 608.

Likewise, the second producer 604 can also determine whether the shared resource 608 is available for writing by exclusive-ORing the values of the three bit registers 616, 620, and 612. Again, a zero result indicates that the producer 604 can write to the shared resource 608, while a one result indicates that the producer 604 may not write to the shared resource 608.

Availability of the shared resource 608 is determined in much the same manner by the consumer 606. The testing logic component 618 of the consumer 606 exclusive-ORs the value of the three bit registers 616, 620, and 612. If the result of the exclusive-OR is one, then fresh data exist in the shared resource 608, and the consumer 606 may read from the shared resource. On the other hand, if the result of the exclusive-OR is zero, then stale data exist in the shared resource 608, and the consumer 606 cannot read from the shared resource 608.

To illustrate the testing logic involved, the first producer 602 can ascertain the status of the shared resource 608 according to the following equation:

$$P1\_Test = P1\_Bitreg \oplus P2\_Bitreg \uparrow P1 \oplus C1\_Bitreg \uparrow P1$$

If the result of the P1_Test equation is zero, then any data in the shared resource 608 has already been read by the consumer 606, and the first producer 602 can write new data to the shared resource 608. If, however, the result of the P1_Test equation is one, fresh data exists in the shared resource 608 and the first producer 602 may not write new data to the shared resource 608.

Similar testing logic is used by the consumer 606. The consumer 606 can ascertain the status of the shared resource 608 according to the following equation:

$$C1\_Test = C1\_Bitreg \oplus P1\_Bitreg \uparrow P2C1 \oplus P2\_Bitreg$$

If the result of the C1_Test equation is one, then fresh data exist in the shared resource 608 and the data can be immediately read by the consumer 606. If, however, the result of the C1_Test equation is zero, then the data in the shared resource 608 are stale and the consumer 606 may not read the data.

Figure 7A:
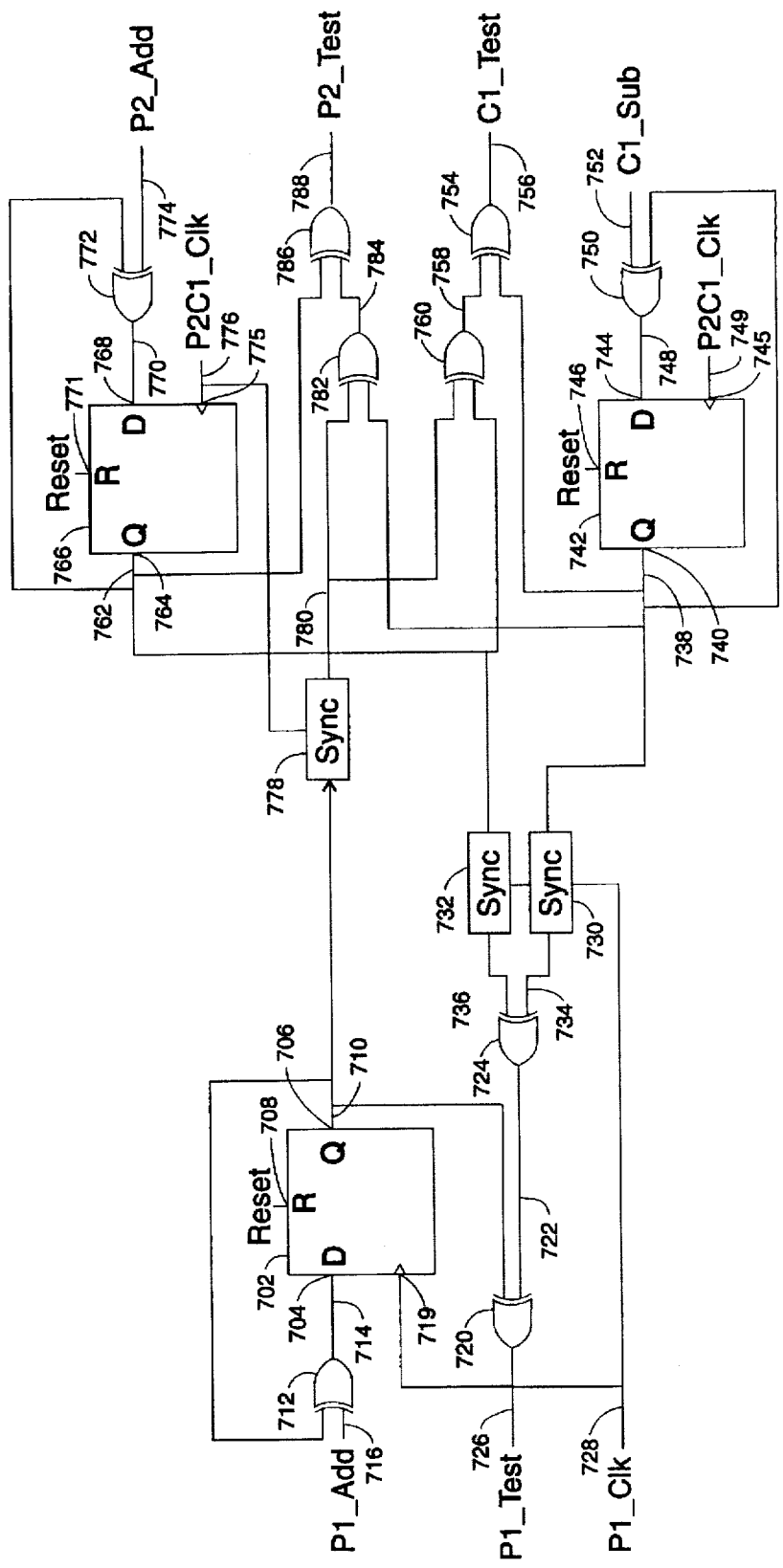
FIG. 7a is a logic diagram illustrating respective bit register components and resource testing components for one producer subsystem operating in one clock domain and for one producer subsystem and one consumer subsystem operating in another clock domain.

FIG. 7a is a logic diagram representing logic which allows two producer subsystems and one consumer subsystem to independently test the status of a shared resource. The shared resource is not shown in FIG. 7a. Further, the two producer subsystems and the consumer subsystem are not shown in their entirety. FIG. 7a illustrates only components which facilitate the bit register and testing logic components described generally in relation to FIG. 6.

FIG. 7a represents a first D flip-flop 702 having a D input 704, a Q output 706, and a reset (R) input 708. The Q output 706 is connected by a line 710 to a first input of an exclusive-OR gate 712. The exclusive-OR gate 712 has an output connected by a line 714 to the D input 704. A second input to the exclusive-OR gate 712 is connected by a line 716 to a P1_Add signal generated by the producer subsystem 602 (FIG. 6). The Q output 706 is connected by the line 710 as a first input to a second exclusive-OR gate 720. A second input to the exclusive-OR gate 720 is connected by a line 722 to an output of an exclusive-OR gate 724. An output of the exclusive-OR gate 720 is connected by a line 726 as a P1_Test input to the producer subsystem 602. The D flip-flop 702 has a clock input 719 which is connected by a line 728 to a first clock (P1_Clk). The clock P1_Clk is also connected by the line 728 to a synchronization element 730 and to another synchronization element 732. An output of the synchronization element 730 is connected by a line 734 as one input to the exclusive-OR gate 724. An output of synchronization element 732 is connected by a line 736 as a second input into the exclusive-OR gate 724.

An input of the synchronization element 730 is connected by a line 738 to a Q output 740 of a D flip-flop 742. The D flip-flop 742 has a D input 744 and a reset (R) input 746. The D flip-flop 742 has a clock input 745 which is connected to a second clock (P2C1_Clk) by a line 749. The D input 744 is connected by a line 748 to an output of an exclusive-OR gate 750. The Q output 740 of the D flip-flop 742 is connected by a line 738 as one input to the exclusive-OR gate 750. A second input to the exclusive-OR gate is connected by a line 752 to a C1_Sub signal generated by the consumer 606 (FIG. 6). The Q output 740 of the D flip-flop 742 is connected by the line 738 as an input to an exclusive-OR gate 754. An output of the exclusive-OR gate 754 is connected by a line 756 to the consumer 606. A second input of the exclusive-OR gate 754 is connected by a line 758 to an output of an exclusive-OR gate 760. An input to the exclusive-OR gate 760 is connected by a line 762 to a Q output 764 of a D flip-flop 766. The D flip-flop 766 has a D input 768 and a reset (R) input 771. An input to the synchronization element 732 is connected by the line 762 to the Q output 764. The D input 768 is connected by a line 770 to an output of an exclusive-OR gate 772. The Q output 764 is connected by the line 762 as an input to the exclusive-OR gate 772. Another input to the exclusive-OR gate 772 is connected by a line 774 to a P2_Add signal generated by a second producer 604 (FIG. 6).

The D flip-flop 766 has a clock input 775 which is connected to the second clock, P2C1_Clk, by a line 776. A synchronization element 778 is also connected by the line 776 to the second clock, P2C1_Clk. An input to synchronization element 778 is connected by line 710 to the Q output 706 of the D flip-flop 702. An output of synchronization element 778 is connected by a line 780 to an input of the exclusive-OR gate 760. The output of synchronization element 778 is also connected by the line 780 to another exclusive-OR gate 782. The Q output 740 of the D flip-flop 742 is connected by the line 738 as a second input to the exclusive-OR gate 782. The output of the exclusive-OR gate 782 is connected by a line 784 to an input of an exclusive-OR gate 786. The Q output 764 of the D flip-flop 766 is connected by the line 762 to a second input of the exclusive-OR gate 786. The output of the exclusive-OR gate 786 is connected by a line 788 as a P2_Test input to the producer 604.

The exclusive-OR gate 712 and the D flip-flop 702 are connected together, as discussed in relation to FIG. 5a, to function as a bit register. Thus, when the producer 602 generates a high pulse (a P1_Add) signal on the line 716, the Q output 706 of the D flip-flop 702 changes logic states (i.e., toggles) from high to low or low to high. The Q output 706 maintains its logic state continuously until changed by a P1_Add signal generated by the producer 602.

A similar bit register for the consumer 606 comprises the exclusive-OR gate 750 and the D flip-flop 742. Accordingly, the Q output 740 of the D flip-flop 742 represents a stable logic state and toggles its logic state each time the consumer 606 generates a high pulse (a C1_Sub) signal on line 752.

FIG. 7a represents a third such bit register for the producer 604. The third bit register comprises the exclusive-OR gate 772 and the D flip-flop 766. The logic state of the Q output 764 of the D flip-flop toggles each time the producer 604 generates a high pulse (a P2_Add) signal on line 774, and the Q output 764 of the D flip-flop 766 represents a stable logic state between toggles.

The lines 710, 738, and 762 propagate signals corresponding respectively to the logic states of the Q outputs 706, 740, and 764. The signals propagated on lines 710, 738, and 762 thus represent the values of the respective bit registers of the producer 602, the consumer 606, and the producer 604. As discussed with respect to FIG. 5a, an independent comparison of the values of bit registers performed by each producer and consumer allows each producer and consumer to determine the availability of a shared resource. As also discussed with respect to FIG. 5a, such a comparison of bit register values can be done by exclusive-ORing the bit register values.

Accordingly, the producer 602 can test the status of the shared resource 608 by exclusive-ORing the signals propagated by the lines 710 (i.e., the value of its own bit register), 738 (i.e., the value of the bit register of the consumer 606), and 762 (i.e., the value of the bit register of the producer 604). It will be understood that the value of the producer's bit register, propagated by the line 710, is synchronous with the clock of the producer 602, P1_Clk. Thus, the value of the bit register of the producer 602 is synchronously available to the producer 602. The signals propagated by the lines 738 and 762 (i.e., the respective values of the bit registers of the consumer 606 and of the producer 604) are, however, asynchronous to P1_Clk. The signals propagated by the lines 738 and 762 must, therefore, be synchronized with P1_Clk before being exclusive-ORed by the producer 602.

As represented in FIG. 7a, the signals propagated by the lines 738 and 762 are input to the respective synchronization elements 730 and 732. The lines 734 and 736 propagate respectively the logic states of the lines 738 and 762 synchronized with P1_Clk. The synchronized logic states propagated by lines 734 and 736 are exclusive-ORed by the exclusive-OR gate 724 (i.e., the bit register values of the producer 604 and the consumer 606 are brought into the clock domain of the producer 602 and compared).

The output of the exclusive-OR gate 724 is propagated by the line 722 as an input to the exclusive-OR gate 720. The signal propagated by the line 710 is also input to the exclusive-OR gate 720. Thus, the exclusive-OR gate 720 compares the value of the bit register of producer 602 to the result of the comparison of the bit register values of the producer 604 and the consumer 606.

The output of the exclusive-OR gate 720 is propagated by the line 726 as a P1_Test signal. The logic state represented by the P1_Test signal determines whether the shared resource 608 is available to the producer 602. If the P1_Test signal is low (i.e., if the number of writes to the shared resource 608 is equal to the number of reads from the shared resource 608), then the producer 602 may write data to the shared resource 608. If, however, the P1_Test signal is high (i.e., if the number of writes to the shared resource 608 is different from the number of reads from the shared resource 608), then the producer 602 may not write data to the shared resource 608.

As discussed in relation to FIG. 5a, the timing relationship between the P1_Add signal and the P1_Test signal is a substantial advantage of the present invention. A P1_Add signal generated by the producer 602 will cause the logic state of the P1_Test signal to be updated within one clock cycle of P1_Clk. The immediate update of the P1_Test signal eliminates any window of time within which the producer 602 is unable to detect the unavailability of the shared resource 608 caused by its own most recent write operation. As described above, there is therefore no need to introduce a delay to prevent the producer 602 from prematurely accessing the shared resource 608.

The producer 604 and the consumer 606 also perform independent comparisons of the signals propagated by the lines 710, 738, and 762. The producer 604 and the consumer 606 operate in synchronism with the same clock, P2C1_Clk. The signals propagated by the lines 738 and 762 are synchronous to P2C1_Clk and therefore do not need to be synchronized before being compared by the producer 604 and the consumer 606. The signal propagated by the line 710 (i.e., the value of the bit register of the producer 602), however, is asynchronous to P2C1_Clk, and must, therefore, be synchronized. Thus, the signal propagated by the line 710 is input to the synchronization element 778.

The output of the synchronization element 778, representing the logic state propagated by the line 710 synchronized to P2C1_Clk, is propagated by the line 780 as an input to the exclusive-OR gate 760. The bit register value of the producer 604 is propagated by the line 762 as another input to the exclusive-OR gate 760. The exclusive-OR gate 760 thus compares the bit register values of the producer 602 and the producer 604. The output of the exclusive-OR gate 760 is input to the exclusive-OR gate 754. The value of the bit register of the consumer 606 is propagated by the line 738 as another input to the exclusive-OR gate 754. The output of the exclusive-OR gate 754 is a C1_Test signal propagated by the line 756.

The logic state represented by the C1_Test signal determines the availability of the shared resource 608 to the consumer 606. If the C1_Test signal is high (i.e., if the number of writes to the shared resource 608 is different from the number of reads from the shared resource 608), then the consumer 606 can read from the shared resource 608. If the C1_Test signal is low, then the consumer 606 cannot read from the shared resource 608.

The relationship between the P1_Add signal and the P1_Test signal described above is also present between the C1_Sub signal and the C1_Test signal. Because each C1_Sub signal will cause the C1_Test signal to be updated within one cycle of the consumer's 606 clock, P2Cl_Clk, the consumer 606 will not prematurely read from the shared resource 608.

The output of the synchronization element 778, representing the value of the bit register of the producer 604 synchronized to P2Cl_Clk, is also propagated by the line 780 as an input to the exclusive-OR gate 782. The value of the bit register of the consumer 606 is propagated by the line 738 as another input to the exclusive-OR gate 782. The exclusive-OR gate 782 thus compares the bit register values of the producer 602 and the consumer 606. The output of the exclusive-OR gate 782 is propagated by the line 784 as an input to the exclusive-OR gate 786. The value of the bit register of the producer is propagated by the line 762 as another input to the exclusive-OR gate 786. The output of the exclusive-OR gate 786 is a P2_Test signal propagated by the line 788.

The logic state represented by the $P2_{13}$ Test signal determines whether the shared resource 608 is available to the producer 604. If the P2_Test signal is low, then the producer 604 can write to the shared resource 608. If, however, the P2_Test signal is high, then the producer 604 cannot write to the shared resource. The advantageous relationship between the P1_Add signal and the P1_Test signal described above is present also between the P2_Add signal and the P2_Test signal. That is, because the P2_Test signal is updated within one clock cycle of each P2_Add signal, the producer 604 will not prematurely write to the shared resource 608.

As discussed above with respect to FIG. 5a, an active high pulse propagated by a reset line (not shown in FIG. 7a) connected to the reset (R) inputs 708, 746, and 771 causes the producer 602, the producer 604, and the consumer 606 to be set to an initial condition where the shared resource 608 is available for writing.

Figure 7B:
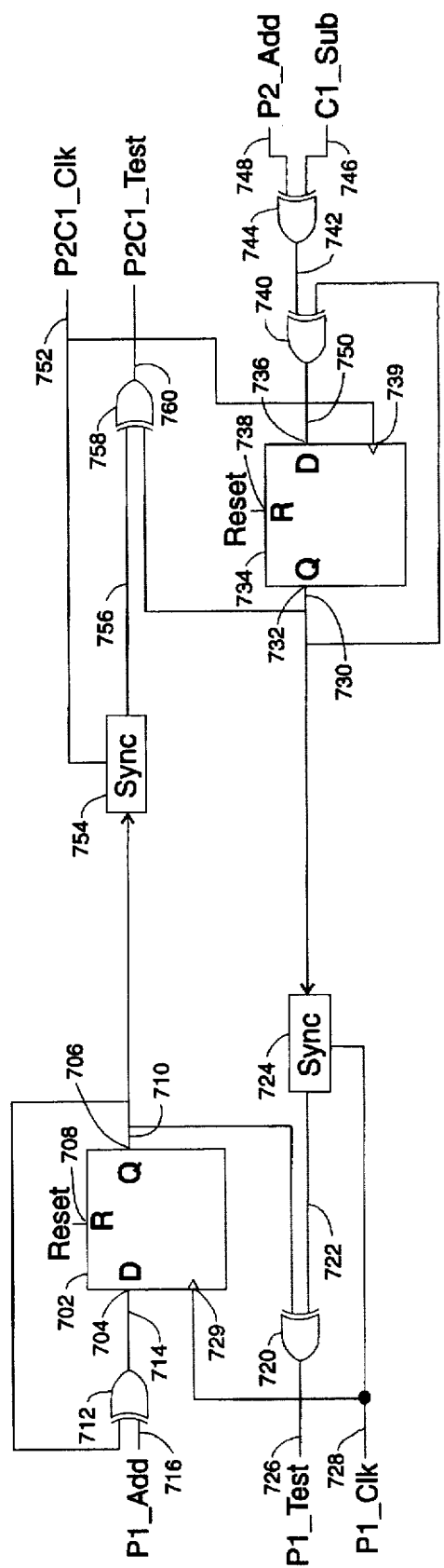
FIG. 7b is a logic diagram illustrating a bit register component and a resource testing component for one producer subsystem operating in one clock domain and a bit register component and a resource testing component shared by one producer subsystem and one consumer subsystem operating in another clock domain.

FIG. 7b is a logic diagram which, like FIG. 7a, represents logic allowing two producer subsystems and one consumer subsystem to independently test the status of a shared resource. The logic diagram in FIG. 7b takes advantage of a common clock shared by the second producer and the consumer to reduce the logic required for the system. The shared resource is not shown in FIG. 7b. The two producer subsystems and the consumer subsystem are not shown in their entirety. Rather, FIG. 7b represents only the components comprising bit registers and testing logic components of the two producer subsystems and the consumer subsystem.

The components in FIG. 7b described by numbers 702 through 720 are identical to the components described by the same numbers in FIG. 7a and therefore descriptions of these components will not be repeated.

A line 722 connects the output of a synchronization element 724 to an input to the exclusive-OR gate 720. The output of the exclusive-OR gate 720 is a P1_Test signal propagated by a line 726 as an input to the producer 602 (FIG. 6). A line 728 connects a first clock (P1_Clk) to a clock input 719 of the D flip-flop 702. The line 728 also connects P1_Clk to a synchronization element 724. A line 730 connects a Q output 732 of a D flip-flop 734 to an input of the synchronization element 724. The D flip-flop 734 has a D input 736, a reset (R) input 738, and a clock input 739. The line 730 connects the Q output 730 as an input to an exclusive-OR gate 740. A line 742 connects a second input of the exclusive-OR gate 740 to the output of an exclusive-OR gate 744. A first input of the exclusive-OR gate 744 is a C1_Sub signal generated by the consumer 606 (FIG. 6) and propagated by a line 746. A second input of the exclusive-OR gate 744 is a P2_Add signal generated by the consumer 604 (FIG. 6) and propagated by a line 748. An output of the exclusive-OR gate 740 is propagated by a line 750 to the D input 736 of the D flip-flop 734.

A second clock (P2C1_Clk) is connected by a line 752 to the clock input 739 of the D flip-flop 734. The line 752 also connects P2C1_Clk to a synchronization element 754. An input of the synchronization element 754 is connected by the line 710 to the Q output 706 of the D flip-flop 702. An output of the synchronization element 754 is connected by a line 756 to an input of an exclusive-OR gate 758. A second input of the exclusive-OR gate is connected by the line 730 to the Q output 732 of the D flip-flop 734. An output of the exclusive-OR gate 758 is a P2C1_Test signal propagated by a line 760.

A first bit register of FIG. 7b used by the producer 602 comprises the exclusive-OR gate 712 and the D flip-flop 702. However, the exclusive-OR gate 712 and the D flip-flop 702 function identically to the like numbered components described in FIG. 7a and therefore their description will not be repeated. Also, the relationship between the P1_Add signal and the P1_Test signal in FIG. 7b is identical to the relationship between the same signals described in relation to FIG. 7a and a description of their operation will thus not be repeated.

Because the producer 604 and the consumer 606 operate in synchronism with the same clock, P2C1_Clk, the logic comprising the respective bit register functions can be simplified, as can the logic required to test the status of the shared resource 608. Accordingly, a second bit register in FIG. 7b is shared by the producer 604 and the consumer 606. The second bit register comprises the exclusive-OR gate 740 and the D flip-flop 734. As described above, because the Q output 732 of the D flip-flop 734 is propagated by the line 730 to an input of the exclusive-OR gate 740 and because an output of the exclusive-OR gate 740 is propagated by the line 750 to the D input 736 of the D flip-flop 734, the exclusive-OR gate 740 and the D flip-flop 734 function as a bit register. That is to say that a high pulse signal propagated by the line 742 as a second input to the exclusive-OR gate 740 causes the D flip-flop 734 to toggle the logic state of the Q output 732 and to propagate such logic state by the line 730 until another such high pulse signal is propagated by the line 742.

The P2_Add signal and the C1_Sub signal are propagated as inputs to the exclusive-OR gate 744 by the respective lines 748 and 746. It will be understood that the output of the exclusive-OR gate 744 propagated by the line 742 represents the P2_Add signal generated by the producer 604 or the C1_Sub signal generated by the consumer. When the P2_Add signal or the C1_Sub signal is generated, the exclusive-OR gate 744 outputs such signal. It will be appreciated, however, that when the P2_Add and the C1_Sub signal are generated at the same time (i.e., arrive at the exclusive-OR gate 744 in the same clock cycle), the logic state output by the exclusive-OR gate 744 will not change. Because the producer 604 and the consumer 606 are operating in the same clock domain and because the second bit register can only be updated by either the producer 604 or the consumer 606 but never both at any particular time, the producer 604 and the consumer 606 can share a bit register as described.

The producer 604 and the consumer 606 also share a P2C1_Test signal which determines the availability of the shared resource 608 for either writing or reading. The P2C1_Test signal propagated by the line 760 represents a logic state resulting from a comparison of the logic state of the first bit register and the logic state of the second bit register. The logic state of the first bit register represents a number of writes to the shared resource 608 initiated by the first producer 602. The logic state of the second bit register represents a number of writes to the shared resource 608 initiated by the second producer 604 reduced by a number of reads from the shared resource initiated by the consumer 606. Because the second bit register is updated by the producer 604 each time the producer 604 initiates a write to the shared resource 608 and is also updated by the consumer 606 each time the consumer 606 initiates a read from the shared resource 608, the need to subsequently compare the write operations of the producer 604 to the read operations of the consumer 606 is eliminated.

The signal propagated by the line 730 to an input of the exclusive-OR gate 758 represents the logic state of the second bit register shared by the producer 604 and the consumer 606. The signal propagated by the line 756 to an input of the exclusive-OR gate 758 represents the logic state of the first bit register synchronized with the clock P2C1_Clk. The output of the exclusive-OR gate 758 is the P2C1₁₃ Test signal which is propagated by the line 760 as an input to the second producer 604 and to the consumer 606.

The logic state represented by the P2C1_Test signal thus determines whether the shared resource 608 is available to the second producer 604 for writing and determines whether the shared resource 608 is available to the consumer 606 for reading. When the P2C1_Test signal is low, the shared resource 608 is available to the second producer 604 for writing but is unavailable to the consumer 606 for reading. When the P2C1_Test signal is high, the shared resource 608 is unavailable to the second producer 604 for writing but is available to the consumer 606 for reading.

Figure 8:
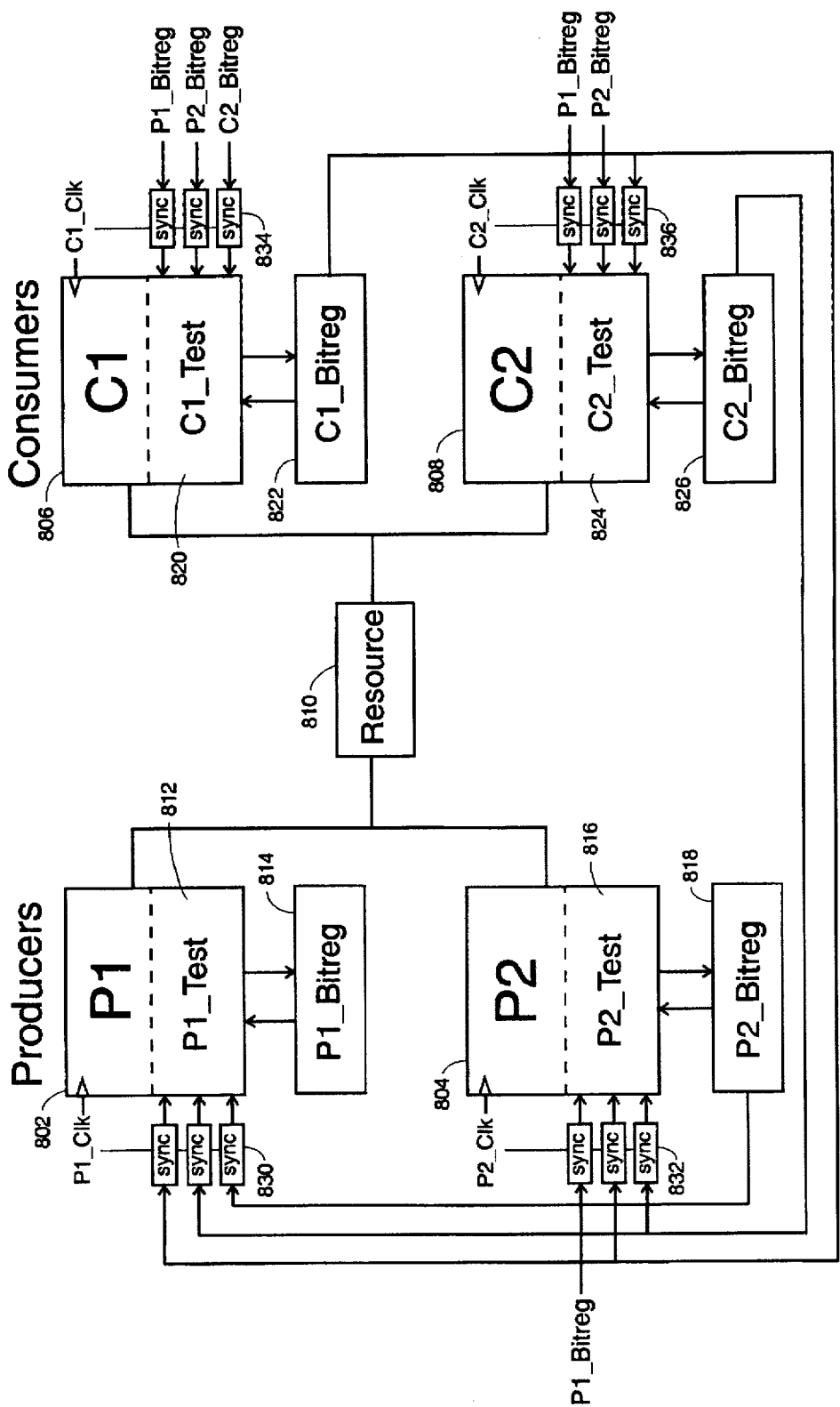
FIG. 8 is a block diagram illustrating a portion of a digital system comprising two producer subsystems and two consumer subsystems, each comprising a bit register, each sharing a common resource, and each operating in a different clock domain.

FIG. 8 is a simplified block diagram representing a portion of a digital system comprising a first producer subsystem 802 operating in synchronism with a first clock (P1_Clk), a second producer subsystem 804 operating in synchronism with a second clock (P2_Clk), a first consumer subsystem 806 operating in synchronism with a third clock (C1_Clk), and a second consumer subsystem 808 operating in synchronism with a fourth clock (C2_Clk). All of the clocks, P1_Clk, P2_Clk, C1_Clk, and C2_Clk are asynchronous with respect to each other.

The first producer 802 comprises a testing logic component 812 and a bit register 814. The second producer 804 comprises a testing logic component 816 and a bit register 818. The first consumer 806 comprises a testing logic component 820 and a bit register 822. The second consumer 808 comprises a testing logic component 824 and a bit register 826.

The four subsystems 802, 804, 806, and 808 share a resource 810. The testing logic components 812, 816, 820, and 824 allow the respective subsystems 802, 804, 806 and 808 to independently determine the status of the shared resource 810. The bit registers 814, 818, 822, and 826 can represent a value of zero or one. Each of the subsystems 802, 804, 806, and 808 can read the value of each of the bit registers 814, 818, 822, and 826. Because the four subsystems 802, 804, 806, and 808 operate in mutually asynchronous clock domains, it will be understood that the value of each of the bit registers 814, 818, 822, and 826 must be synchronized with each asynchronous clock.

Accordingly, FIG. 8 represents, for example, the propagation of the value of the bit register 822 of the first consumer 806, the value of the bit register 826 of the second consumer 808, and the value of the bit register 818 of the second producer 804 into a set of three synchronization elements 830 clocked by P1_Clk. The synchronized values of the bit registers 822, 826, and 818 are propagated into the testing logic component 812 of the first producer 802. Thus, the values of the bit registers 814, 818, 822, and 826 are available to the first producer 802.

Similarly, a set of three synchronization elements 832 clocked by P2_Clk synchronize the value of the bit registers 814, 822, and 826, thus making such values available to the second producer 804. Also, a set of three synchronization elements 834 clocked by C1_Clk synchronize the value oft he bit registers 814, 818, and 826, thereby making such values available to the first consumer. Likewise, a set of three synchronization elements 836 clocked by C2_Clk synchronize the value of the bit registers 814, 818, and 822, making these values available to the second consumer.

As described above, a producer or consumer can determine the status of a shared resource by exclusive-ORing the values of the respective bit registers of each of the subsystems. Thus, the first producer 802 exclusive-ORs the values of each of the bit registers 814, 818, 822, and 826. If the restfit of such exclusive-ORing is zero, then stale data exist in the shared resource 810 and the first producer 802 can write data to the shared resource 810. If, on the other hand, the result of such exclusive-ORing is zero, then fresh data exist in the shared resource 810 and the first producer may not write data to the shared resource 810. The logic required to test the availability of the shared resource 810 is illustrated by the equation:

$$P1\_Test = P1\_Bitreg \oplus P2\_Bitreg \uparrow P1 \oplus C1\_Bitreg \uparrow P1 \oplus C2\_Bitreg \uparrow P1$$

If the result of the P1_Test equation is zero, then any data in the shared resource 810 has already been read by a consumer (the data are stale), and the first producer 802 can write new data to the shared resource 810. If the restfit of the P1_Test equation is one, however, then fresh data exist in the shared resource 810 and the first producer 802 many not write new data to the shared resource 810.

The same testing logic is used by a consumer in FIG. 8. For example, the first consumer 806 can ascertain the status of the shared resource 810 according to the following equation:

$$C1\_Test = C1\_Bitreg \oplus P1\_Bitreg \uparrow P1 \oplus P2\_Bitreg \uparrow P1 \oplus C2_{13} Bitreg \uparrow P1$$

If the result of the C1_Test equation is one, then fresh data exist in the shared resource 810 and the data can be immediately read by the first consumer 806. If, on the other hand, the result of the C1_Test equation is zero, then the data in the shared resource 810 are stale and the first consumer 806 may not read the data. Similar testing logic is provided for the second producer 804 and for the second consumer 808.

Figure 9:
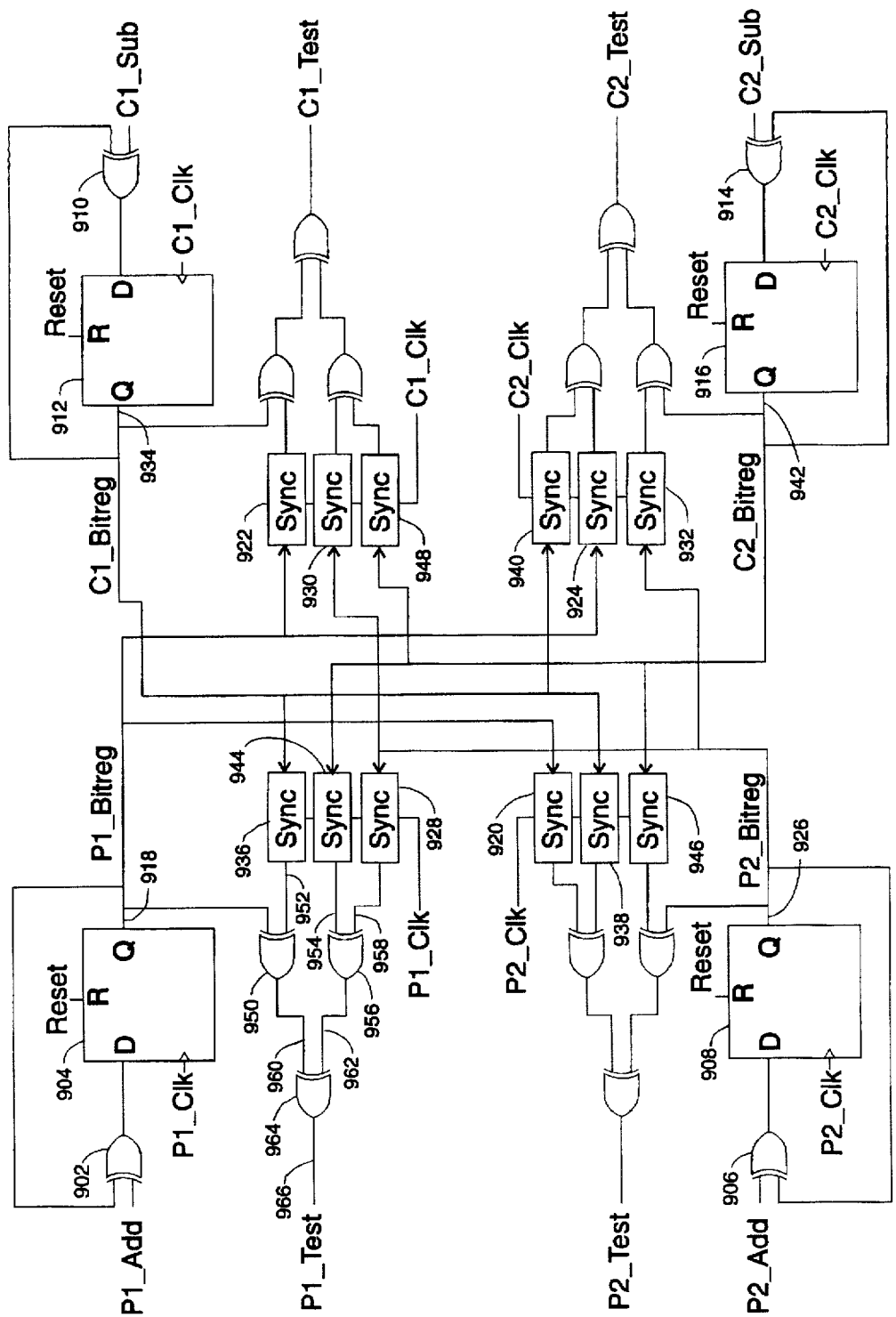
FIG. 9 is a logic diagram representing a portion of a digital system comprising respective bit register components and resource testing components for two producer subsystems and for two consumer subsystems, all subsystems operating in independent clock domains.

FIG. 9 is a logic diagram representing logic which allows two producer subsystems and two consumer subsystems, operating in asynchronous clock domains, to independently test the status of a shared resource. The shared resource is not shown in FIG. 9. Further, the two producer subsystems and the two consumer subsystems are not shown in their entirety. Rather, FIG. 9 illustrates only the logic which facilitates the bit register components and testing logic components described generally in relation to FIG. 8.

A first bit register comprises an exclusive-OR gate 902, a D flip-flop 904 clocked by a P1_Clk, and a P1_Add signal input to the first register by the first producer 802. Detailed descriptions of the components of such a bit register, as well as the operation of such a bit register have been provided above and hence will not be repeated. A P1_Bitreg signal represents the logic state of the first bit register. Thus, the value of the bit register of the first producer 802 (FIG. 8) is represented by the P1_Bitreg signal.

A second, third, and fourth bit register, respectively, comprise an exclusive-OR gate 906 and a D flip-flop 908 clocked by a P2_Clk, an exclusive-OR gate 910 and a D flip-flop 912 clocked by a C1_Clk, and an exclusive-OR gate 914 and a D flip-flop 916 clocked by a C2_Clk. The second bit register further comprises a P2_Add signal input to the second bit register by the second producer 804. The third bit register further comprises a C1_Sub signal input to the third bit register by the first consumer 806. Also, the fourth bit register further comprises a C2_Sub signal input to the fourth bit register by the second consumer 808. The logic states of the second, third, and fourth bit registers are respectively represented by a P2_Bitreg signal, a C1_Bitreg signal, and a C2_Bitreg signal. The values of the respective bit registers of the second producer 804, the first consumer 806, and the second consumer 808 are thus respectively represented by the P2_Bitreg signal, the C1_Bitreg signal, and the C2_Bitreg signal.

The first, second, third and fourth bit registers operate in mutually exclusive clock domains. Therefore, the values of the bit registers, P1_Bitreg, P2_Bitreg, C1_Bitreg and C2_Bitreg must be synchronized to each asynchronous clock to make such values available to each of the producer and consumer subsystems.

Accordingly, FIG. 9 represents a line 918 propagating the P1_Bitreg signal as an input to a synchronization element 920 clocked to P2_Clk, as an input to a synchronization element 922 clocked by C1_Clk, and as an input to a synchronization element 924 clocked by C2_Clk. A line 926 similarly propagates the P2_Bitreg signal as an input to a synchronization element 928 clocked to P1_Clk, as an input to a synchronization element 930 clocked by C1_Clk, and as an input to a synchronization element 932 clocked by C2_Clk. Also a line 934 propagates the C1_Bitreg signal as an input to a synchronization element 936 clocked by P1_Clk, as an input to a synchronization element 938 clocked to P2_Clk, and as an input to a synchronization element 940 clocked by C2_Clk. Likewise, a line 942 propagates the C2_Bitreg signal as an input to a synchronization element 944 clocked to P1_Clk, as an input to a synchronization element 946 clocked by P2_Clk, and as an input to a synchronization element 948 clocked by C1_Clk.

As described above in relation to FIG. 8, the status of the shared resource can be ascertained by exclusive-ORing the values of the bit registers of each of the producer and consumer subsystems. FIG. 9 thus represents, for example, the P1_Bitreg signal being propagated by the line 918 an input to an exclusive-OR gate 950. A line 952 propagates the C1_Bitreg signal synchronous to P1_Clk as a second input to the exclusive-OR gate 950. A line 954 propagates the C2_Bitreg signal synchronous to P1_Clk as a first input to an exclusive-OR gate 956. A line 958 propagates the P2_Bitreg signal synchronous to P1_Clk as a second input to the exclusive-OR gate 956. An output of the exclusive-OR gate 950 is propagated by the line 960 as an input to an exclusive-OR gate 964. An output of the exclusive-OR gate 956 is propagated by the line 962 as a second input to the exclusive-OR gate 964. An output of the exclusive-OR gate 964 is a P1_Test signal propagated by the line 966 as an input to the first producer 802.

Exclusive-ORing the values of the bit registers, P1_Bitreg, P2_Bitreg, C1_Bitreg, and C2_Bitreg is thus accomplished by the exclusive-OR gates 950, 956, and 964. The result of the such exclusive-ORing is the P1_Test signal propagated by the line 966. The value of the P1_Test signal determines whether the shared resource 810 is available to the first producer 802 for writing. If the P1_Test signal is low, then the first producer 802 can write new data to the shared resource 810. If, however, the P1_Test signal is high, then the first producer 802 cannot write new data to the shared resource 810.

It will be understood that the relationship between P1_Add and P1_Test described above is present between P1_Add and P1_Test as represented in FIG. 9. That is to say that each P1_Add signal generated by the first producer 802 updates P1_Test within one clock cycle of the first producer's clock, P1_Clk. The first producer, notified immediately by the P1_Test signal that the shared resource 810 has become unavailable, will be prevented from prematurely accessing the shared resource 810. A similar relationship is present with respect to P2_Add and P2_Test, with respect to C1_Sub and C1_Test, and with respect to C2_Sub and C2_Test.

The structures and operations of the P2_Test circuit, the C1_Test circuit, and the C2_Test circuit in FIG. 9 are analogous to the structure and operation of the P1_Test circuit and they will not be discussed in detail herein.

The present invention is directed to digital systems having any number of producer subsystems or consumer subsystems. It will be appreciated that when a resource is shared by two or more producer subsystems or two or more consumer subsystems, an arbiter element is needed to prevent two or more producer subsystems from simultaneously writing to a shared resource, or to prevent two or more consumer subsystems from simultaneously reading from a shared resource. Such uncontrolled simultaneous accesses to shared resources are known as race conditions.

The basic functions of an arbiter are 1) receiving requests for a resource; 2) receiving releases of a resource; 3) arbitrating between all requesters of a resource; and 4) granting a resource to one of the requesters. By using these functions to regulate access to a resource, an arbiter can avoid race conditions. Many such arbiter elements are known, and the present invention is not directed to specific arbiter elements.

However, another advantage of the present invention is appreciated when an embodiment of the present invention involves two or more producer subsystems or two or more consumer subsystems and thus requires an arbiter. Traditional methods for determining the status of a shared resource involve using a semaphore to represent an available or unavailable status. Under the traditional method, each subsystem desiring access to a shared resource first checks the value of the semaphore. In systems involving multiple clock domains, it will be appreciated that accessing the value of the semaphore as well as updating the value of the semaphore require synchronization delays for all subsystems operating asynchronous to the semaphore. Such delays complicate the design of an arbiter.

After an arbiter detects that a resource has been released, an arbiter will then grant access to the resource to another requester. However, if, because of synchronization delays, the newly granted requester cannot yet detect an update to the semaphore indicating unavailability of the resource, the newly granted requester will have access to the resource (as granted by the arbiter) but will access the resource prematurely (e.g., a producer will write data to a resource which already contains fresh data or a consumer will read data that has already been read). To correct such premature accesses, arbiters are traditionally designed with built-in delays equal to or longer than the worst-case synchronization delay required to allow the slowest-clocked subsystem to detect semaphore updates.

When the present invention is used to determine the status of a shared resource, the traditional need for a common semaphore to represent the status of the shared resource is eliminated. In accordance with the present invention, each producer or consumer sends an update signal directly to every other producer and consumer. Thus, only one synchronization operation is required to allow any producer or consumer to detect an update to the status of a shared resource. As demonstrated below in FIGS. 10a, 10b, and 10c, the fact that the maximum update delay to any producer or consumer is equivalent to a single synchronization operation eliminates the need to introduce built-in delays in the design of an arbiter. Thus, the degradation in processing speed caused by sharing resources and arbiting the access to resources is minimized.

Figure 10A:
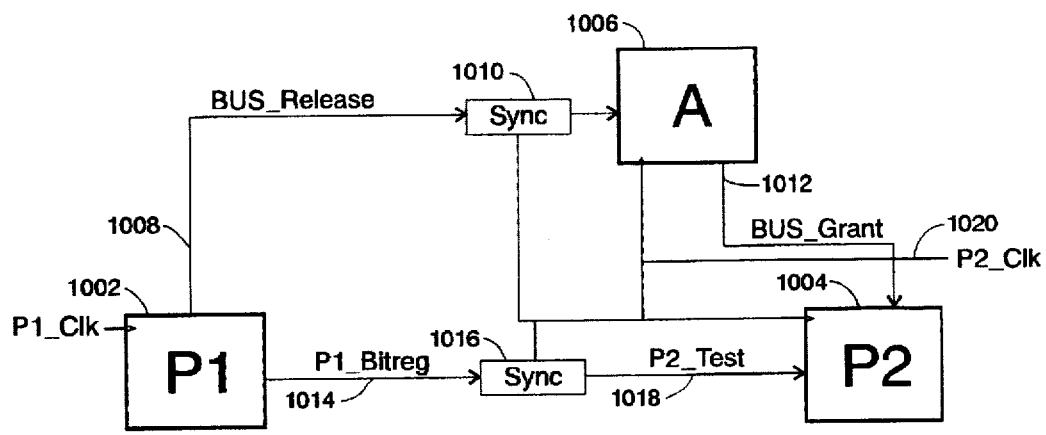
FIG. 10a is a block diagram representing two producers each operating in a different clock domain and being regulated by an arbiter operating in the clock domain of the second producer.

FIG. 10a is a simplified block diagram illustrating a portion of a digital system comprising a first producer 1002 operating in synchronism with a first clock, P1_Clk, a second producer 1004 operating in synchronism with a second clock, P2_Clk, and an arbiter 1006 operating in synchronism with the second clock, P2_Clk. A line 1008 propagates a BUS_Release signal generated by the first producer 1002 as an input to a synchronization element 1010 clocked by P2_Clk. The output of the synchronization element 1010 is propagated as an input to the arbiter 1006. A line 1012 propagates a BUS_Grant signal generated by the arbiter 1006 as an input to the second producer 1004. A line 1014 propagates a P1_Bitreg signal generated by the first producer 1002 as an input to a synchronization element 1016 clocked by P2_Clk. An output of the synchronization element 1016 is propagated by a line 1018 as an input to the second producer 1004. A line 1020 connects the second clock, P2_Clk, to the synchronization element 1010, to the synchronization element 1016, to the arbiter 1006, and to the second producer 1004.

The first producer 1002 updates the P1_Bitreg signal upon initiating a write operation to a shared resource (not shown). The P1_Bitreg signal is synchronous with the clock, P1_Clk, of the first producer. As described above, to determine the status of a shared resource under the present invention, the second producer 1004 must be able to read the logic state of the P1_Bitreg signal to compare it to the logic state of its own bit register. The logic state of the P1_Bitreg signal is thus synchronized with P2_Clk by the synchronization element 1016, and the synchronized P1_Bitreg signal is propagated by the line 1018 to the second producer 1004.

When the first producer 1002 initiates a write to a shared resource, the first producer also generates the BUS_Release signal propagated by the line 1008 as an input to the synchronization element 1010. Because the arbiter is operating in synchronism with the second clock, P2_Clk, the BUS_Release signal must be synchronized with P2_Clk before the arbiter 1006 can receive the BUS_Release signal. The output of the synchronization element 1010 represents the BUS_Release signal synchronized with P2_Clk. The synchronized BUS_Release signal is propagated as an input to the arbiter 1006. Having received the BUS_Release signal, the arbiter 1006 responds by generating a BUS_Grant signal, in effect granting access to the shared resource to the second producer 1004. Because the BUS_Grant signal is synchronous with P2_Clk, it is propagated directly as an input to the second producer 1004.

FIG. 10a shows that when an arbiter 1006 is operating in synchronism with one producer subsystem, and when the present invention is used to determine the status of a shared resource, no built-in delay is required to be introduced into the arbiter 1006 to ensure proper arbiter timing. The second producer 1004 is notified of any change to the status of the shared resource caused by the first producer 1002 as soon as the P1_Bitreg signal is synchronized with P2_Clk by the synchronization element 1016. At least the same amount of time is taken for the BUS_Release signal to be synchronized with P2_Clk and propagated to the arbiter 1006, and for the arbiter 1006 to responsively generate the BUS_Grant signal propagated to the second producer 1004. It will thus be appreciated that the arbiter 1006 cannot detect the BUS_Release signal of the first producer 1002 and also grant the bus to the second producer 1004 by a BUS_Grant signal before the second producer 1004 can detect the updated P1_Bitreg signal of the first producer 1002. There is therefore no possibility of a race condition, despite the fact that no built-in delay is introduced to slow the arbiter 1006.

Figure 10B:
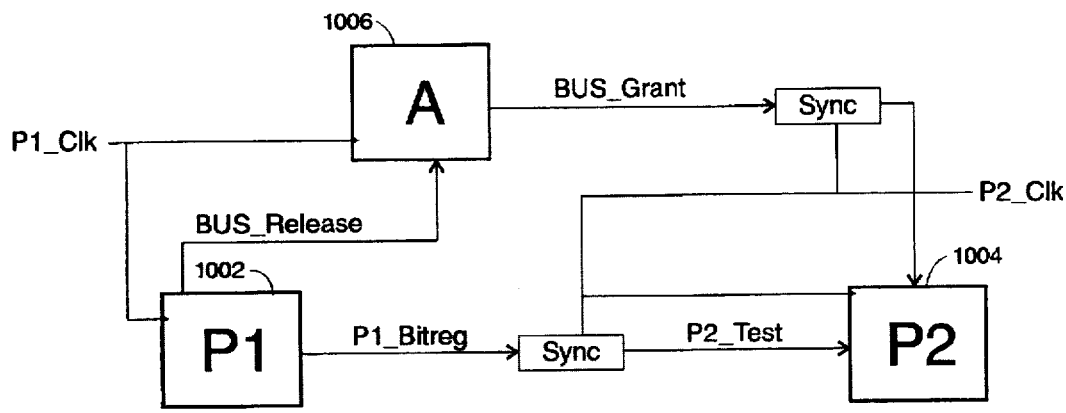
FIG. 10b is a block diagram representing two producers each operating in a different clock domain and being regulated by an arbiter operating in the clock domain of the first producer.

FIG. 10b is a simplified block diagram representing the same components as represented in FIG. 10a. In FIG. 10b, however, the arbiter 1006 is operating in synchronism with the first producer 1002. The arbiter 1006 can therefore receive the BUS_Release signal directly from the first producer 1002 with no synchronization. Yet, because the second producer 1004 is asynchronous to the arbiter 1006, the BUS_Grant signal generated by the arbiter 1006 must be synchronized with P2_Clk before the second producer 1004 will detect the BUS_Grant signal. As was true with respect to FIG. 10a, the arbiter 1006 cannot detect the BUS_Release signal of the first producer 1002 and also grant the bus to the second producer 1004 by a BUS_Grant signal before the second producer 1004 can detect the updated P1_Bitreg signal of the first producer 1002.

Figure 10C:
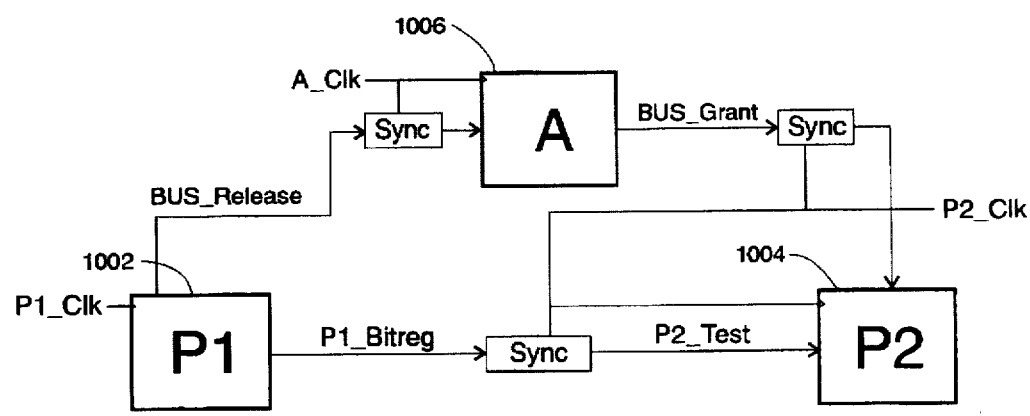
FIG. 10c is a block diagram representing two producer subsystems each operating in a different clock domain, both producers being regulated by an arbiter operating in still another clock domain.

FIG. 10c represents the same components described in FIGS. 10a and 10b, except that the arbiter 1006 is operating in synchronism with a clock, A_Clk, that is asynchronous to both P1_Clk and P2_Clk. As such, the BUS_Release signal generated by the first producer 1002 must be synchronized with A_Clk before the arbiter 1006 can detect the BUS_Release signal. Also, because the arbiter 1006 is asynchronous with the second producer 1004, the BUS_Grant signal generated by the arbiter 1006 must be synchronized with P2_Clk before the second producer 1004 can detect the BUS_Grant signal. Thus, because both the BUS_Release signal propagated to the arbiter 1006 as well as the BUS_Grant signal generated by the arbiter 1006 must be synchronized, it is not possible for the arbiter 1006 to detect the BUS Release signal of the first producer 1002 and also grant the bus to the second producer 1004 by a BUS_Grant signal before the second producer 1004 can detect the updated P1_Bitreg signal of the first producer 1002.

FIGS. 10a, 10b and 10c demonstrate that, regardless of the clock domain selected for an arbiter, the present invention avoids any need to interpose any additional delay to or from an arbiter to prevent race conditions.

Figure 11:
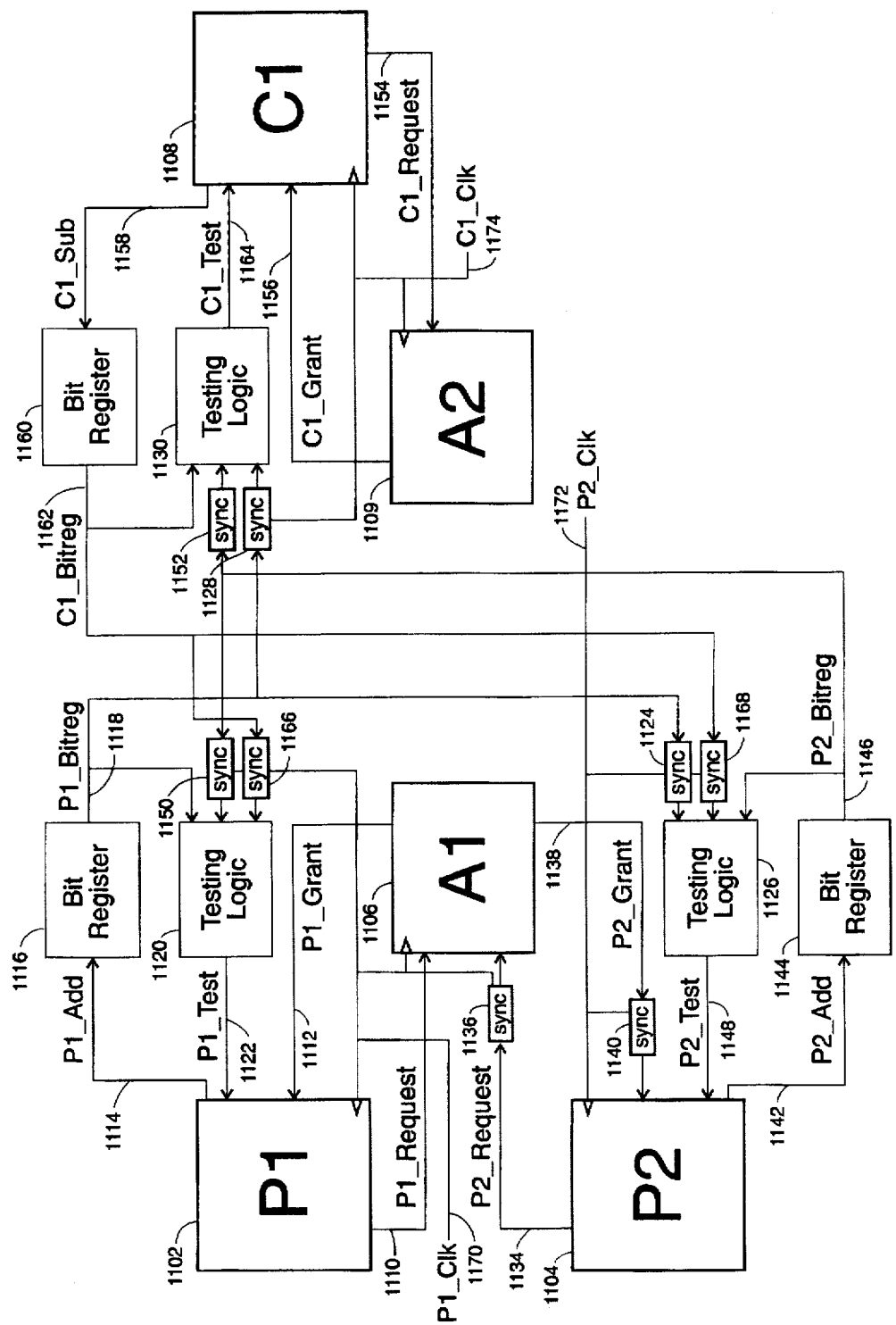
FIG. 11 is a block diagram representing two producer subsystems operating in different clock domains being regulated by an arbiter operating in a third clock domain where signals from each producer to the arbiter and from the arbiter to each producer are synchronized into the respective clock domain of the other.

FIG. 11 is a simplified block diagram representing a first producer 1102 operating in synchronism with a first clock, P1_Clk, a second producer 1104 operating in synchronism with a second clock, P2_Clk, a first arbiter 1106 operating in synchronism with P1_Clk, a consumer 1108 operating in synchronism with a fourth clock, C1_Clk, and a second arbiter 1109 operating in synchronism with C1_Clk. The three clocks, P1_Clk, P2_Clk, and C1_Clk are mutually asynchronous.

A line 1110 propagates a P1_Request signal generated by the first producer 1102 as an input to the first arbiter 1106. A line 1112 propagates a P1_Grant signal generated by the first arbiter 1106 as an input to the first producer 1102. A line 1114 propagates a P1_Add signal generated by the first producer 1102 as an input to a first bit register 1116. A line 1118 propagates a P1_Bitreg signal generated by the first bit register 1118 as an input to a first testing logic component 1120. An output of the first testing logic component 1120 is a P1_Test signal propagated by a line 1122 as an input to the first producer 1102.

The line 1118 also propagates the P1_Bitreg signal as an input to a synchronization element 1124 clocked by P2_Clk. An output of the synchronization element 1124 is propagated as an input to a second testing logic component 1126. The line 1118 further propagates the P1_Bitreg signal as an input to a synchronization element 1128 clocked by C1_Clk. An output of the synchronization element 1128 is propagated as an input to a third testing logic component 1130.

A line 1134 propagates a P2_Request signal generated by the second producer 1104 as an input to a synchronization element 1136 clocked by P1_Clk. An output of the synchronization element 1136 is propagated as an input to the first arbiter 1106. A P2_Grant signal generated by the first arbiter 1106 is propagated by a line 1138 as an input to a synchronization element 1140 clocked by P2_Clk. A P2_Add signal generated by the second producer 1104 is propagated by a line 1142 to a second bit register 1144. A P2_Bitreg signal is generated by the second bit register 1144 and propagated by a line 1146 to the second testing logic component 1126. The second testing logic component 1126 generates a P2_Test signal propagated by a line 1148 as an input to the second producer 1104. The line 1146 propagates the P2_Bitreg signal as an input to a synchronization element 1150 clocked by P1_Clk. An output of the synchronization element 1150 is propagated as an input to the first testing logic component 1120. The line 1146 also propagates the P2_Bitreg signal as an input to a synchronization element 1152 clocked by C1_Clk. An output of the synchronization element 1152 is propagated as an input to the third testing logic component 1130.

A line 1154 propagates a C1_Request signal generated by the consumer 1108 as an input to the second arbiter 1109. The second arbiter 1109 generates a C1_Grant signal propagated by a line 1156 as an input to the consumer 1108. The consumer generates a C1_Sub signal propagated by a line 1158 as an input to a third bit register 1160. The third bit register generates a C1_Bitreg signal propagated by a line 1162 as an input to the third testing logic component 1130. The third testing logic component generates a C1_Test signal propagated by a line 1164 as an input to the consumer 1108. The line 1162 also propagates the C1_Bitreg signal as an input to a synchronization element 1166 clocked by P1_Clk. An output of the synchronization element 1166 is propagated as an input to the first testing logic component 1120. The line 1162 further propagates the C1_Bitreg signal as an input to a synchronization element 1168 clocked by P2_Clk. An output of the synchronization element 1168 is propagated as an input to the second testing logic component 1126.

A line 1170 connects P1_Clk to the first producer 1102, to the first arbiter 1106, and to the synchronization elements 1136, 1150, and 1166. A line 1172 connects P2_Clk to the second producer 1104 and to the synchronization elements 1140, 1124, and 1168. A line 1174 connects C1_Clk to the consumer 1108, to the second arbiter 1109, and to the synchronization elements 1128 and 1152.

Figure 12:
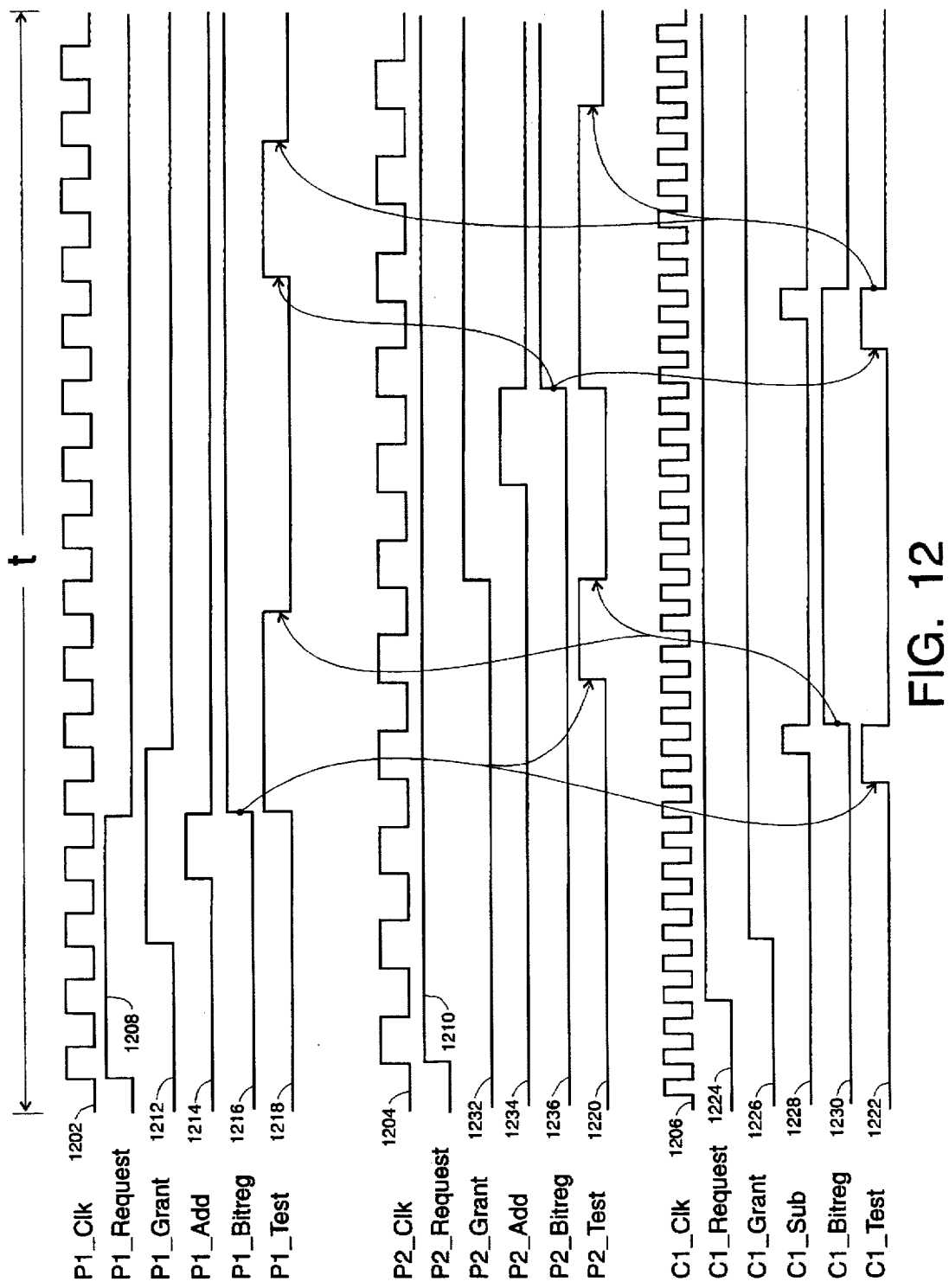
FIG. 12 is a waveform timing diagram representing respective resource requests and grants for a first producer, a second producer, and a consumer.

FIG. 12 is a timing diagram representing timing relationships between certain signals generated by the components described in FIG. 11. FIG. 12 comprises signals generated in synchronism with the three clocks, P1_Clk, P2_Clk and C1_Clk over a time interval (t). The P1_Clk signal 1202 represents the logic state transitions generated by P1_Clk during the time interval t. The P2_Clk signal 1204 represents the logic state transitions generated by P2_Clk during the time interval t. Likewise, the C1_Clk signal 1206 represents the logic state transitions generated by C1_Clk during the time interval t. It will be appreciated that the P2_Clk generates fewer transitions during the time interval t than the P1_Clk signal (i.e., P2_Clk is faster than P1_Clk). Similarly, the C1_Clk signal generates more transitions during time t than the P1_Clk signal (i.e., C1_Clk is faster than P1_Clk.

A P1_Request signal 1208 and a P2_Request signal 1210 transition from low to high in respective Synchronism with the P1_Clk signal 1202 and the P2_Clk signal 1204. The P1_Request and P2_Request signals 1208 and 1210 are generated respectively by the first producer 1102 (FIG. 11) and the second producer 1104 (FIG. 11) almost simultaneously. The P1_Request and P2_Request signals are propagated respectively by the lines 1110 and 1134 (FIG. 11) to the first arbiter 1106. It will be understood that the first producer 1102 and the second producer 1104 are thereby vying for access to a shared resource (not shown).

A C1_Request signal 1224 generated by the consumer 1108 (FIG. 11) transitions from low to high in synchronism with the C1_Clk signal 1206. The transition of the C1_Request signal 1224, propagated as an input to the second arbiter 1109, indicates that the consumer 1108 seeks access to the shared resource. Following the transition of the C1_Request signal 1224, a C1_Grant signal 1226 generated by the second arbiter 1109 transitions from low to high indicating that the second arbiter 1109 has granted access to the shared resource to the consumer 1108. Other consumers vying for access to the shared resource are not shown.

Following the low to high transitions of the P1_Request signal 1208 and the P2_Request 1210 signal, a P1_Grant signal 1212 transitions from low to high. The P1_Grant signal is generated by the first arbiter 1106 indicating that the first producer has been granted the right to access the shared resource. The P2_Request signal 1210 remains high, indicating that the second producer continues to seek access to the shared resource.

Having access to the shared resource, the first producer 1102 initiates a write access to the shared resource and also generates a P1_Add signal indicating such write access was initiated. Consequently, upon the next full transition generated by the P1_Clk signal following the transition of the P1_Grant signal, a P1_Add signal 1214 transitions from low to high. The P1_Add signal 1214 is input to the first bit register 1116. Upon the next full transition of the P1_Clk signal 1202, the first bit register 1116 (FIG. 11) changes the logic state of a P1_Bitreg signal 1216 from low to high. Also, because the first producer 1102 has initiated the write access to the shared resource, the first producer withdraws its request for access to the resource by changing the logic state of the P1_Request signal from high to low.

Because the P1_Add signal 1214 is a pulse signal, it transitions to low at the same time the logic state of the P1_Bitreg signal 1216 changes. The P1_Bitreg signal 1216 is propagated immediately as an input to the first testing logic component 1120 (FIG. 11) which, also immediately, causes the logic state of a P1_Test signal 1218 to change from low to high. Importantly, because the P1_Test signal 1218 is updated within one full transition of the P1_Clk signal 1202 following the initiation of the write access by the first producer 1102, the first producer 1102 is notified of the change in status of the shared resource caused by its own write access and cannot possibly generate another write access before being so notified.

The P1_Bitreg signal is propagated by the line 1118 to the synchronization element 1124 clocked by P2_Clk. The output of the synchronization element 1124, representing the P1_Bitreg signal synchronized with P2_Clk, is then propagated to the second testing logic component 1126. Because the synchronization element 1124 is clocked by P2_Clk, the second testing logic component does not update a P2_Test signal 1220 until one full transition of the P2_Clk signal 1204 occurs. Thus, the P2_Test signal 1220, being asynchronous to the P1_Bitreg signal 1216, transitions from low to high upon the occurrence of one full transition of the P2_Clk signal 1204 following the transition of the P1_Bitreg signal 1216.

Similar synchronization of the P1_Bitreg signal occurs with respect to the third testing logic component 1130. Consequently, the third testing logic component 1130 does not update the logic state of a C1_Test signal 1222 until one full transition of the C1_Clk signal occurs following the transition of the P1_Bitreg signal 1216. The C1_Test signal 1222 is asynchronous to the P1_Bitreg signal 1216, and therefore transitions from low to high upon the occurrence of one full transition of the C1_Clk signal 1206 following the transition of the P1_Bitreg signal 1216.

Upon the transitioning of the P2_Test signal 1220 and the C1_Test signal 1222, the second producer 1104 and the consumer 1108 are respectively able to detect the change in status of the shared resource resulting from the write access initiated by the first producer 1102. Because the C1_Clk signal 1206 generates transitions faster than the P2_Clk signal 1204, the consumer 1108 is able to detect such change in the status of the shared resource earlier than the second producer 1104.

The consumer 1108, already being granted access to the shared resource by the second arbiter 1109, initiates a read access to the shared resource within one full transition of the C1_Clk signal 1206 following the transition of the C1_Test signal 1222. The consumer 1108 indicates the initiated read access by generating a C1_Sub signal 1228. Like the P1_Add signal 1214, the C1_Sub signal 1228 is a pulse and hence transitions from low to high and then from high to low during one cycle of the C1_Clk signal 1206. The C1_Sub signal 1228 propagates to the third bit register 1160. The third bit register 1160 causes a C1_Bitreg signal 1230 to change from low to high upon the next full transition of the C1_Clk signal 1206.

The C1_Bitreg signal 1230 is immediately propagated to the third testing logic component 1160 (FIG. 11), which immediately changes the C1_Test signal 1222 from high to low. The C1_Bitreg signal 1230 is propagated to synchronization elements 1166 and 1168, thereby synchronizing the C1_Bitreg signal 1230 respectively with the P1_Clk signal 1202 and the P2_Clk signal 1204. Following such synchronization, the P1_Test signal 1218 transitions from high to low upon one full transition of the P1_Clk signal 1202 following the transition of the C1_Test signal 1222. Likewise the P2_Test signal 1220 transitions from high to low upon one full transition of the P2_Clk signal 1204 following the transition of the C1_Test signal 1222. Such transitions of the P1_Test signal 1218 and the P2_Test signal 1220 indicate that the first producer 1102 and the second producer 1104 can detect the change in status of the shared resource caused by the consumer 1108 initiating a read access to the shared resource.

Because the first producer 1102 changed the logic state of the P1_Request 1208 signal from high to low, and because the second producer has maintained a high logic state of the P2_Request signal 1210, the first arbiter 1106 causes the signal P2_Grant 1232 to transition from low to high, thereby granting access to the shared resource to the second producer 1104. The second producer, having access to the shared resource and being notified by the low logic state of the P2_Test signal 1220 that the shared resource is available, initiates a write access to the shared resource. To indicate that such write access has been initiated, the second producer 1104 causes a P2_Add signal 1234 to transition from low to high. Because the P2_add signal 1234 is a pulse, it transitions from low to high and from high to low during one full transition of the P2_Clk signal 1204.

The P2_Add signal 1234 is propagated to the second bit register 1144 which causes a P2_Bitreg signal 1236 to transition from low to high upon one full transition of the P2_Clk signal 1204 following the transition of the P2_Add signal 1234. The P2_Bitreg signal 1236 is immediately propagated to the second testing logic component 1126 which, also immediately, causes the P2_Test signal 1220 to transition from low to high.

The P2_Bitreg signal 1236 is propagated to synchronization elements 1150 and 1152 which respectively synchronize the P2_Bitreg signal 1236 with the P1_Clk signal 1202 and the C1_Clk signal 1206. After such synchronization, the synchronized P2_Bitreg signal 1236 is propagated respectively to the first testing logic component 1120 and to the third testing logic component 1130.

The first testing logic component causes the P1_Test signal 1218 to transition from low to high. However, because the P2_Bitreg signal 1236 is asynchronous with the $P1_{13}$ Test signal 1218, the P1_Test signal 1218 does not transition until one full transition of the P1_Clk signal has occurred following the transition of the P2_Bitreg signal 1236.

Similarly, third testing logic component causes the C1_Test signal 1222 to transition from low to high with such transition occurring upon one full transition of the C1_Clk signal 1206 following the transition of the P2_Bitreg signal 1236.

The $C1_{13}$ Grant signal 1226 has maintained a high logic state, and thus the consumer 1108 still has access to the shared resource. Because the C1_Test signal 1222 represents a high logic state, the shared resource is available to the consumer 1108. The consumer 1108 thus initiates a read access to the shared resource and generates a pulse C1_Sub signal 1228 to indicate that such read access was initiated. As described above, the C1_Sub signal 1228, being a pulse, drops to low during one full transition of the C1_Clk signal 1206. The C1_Sub signal 1228 is propagated to the third bit register 1160 which causes the C1_Bitreg signal 1230 to transition from high to low. The C1_Bitreg signal 1230 propagates to the third testing logic component 1130 which immediately causes the C1_Test signal 1222 to transition from high to low. As also described above, the C1_Bitreg signal 1230 is synchronized to the P1_Clk signal 1202 and the P2_Clk signal 1204 respectively causing the P1_Test signal 1218 and the $P2_{13}$ Test signal 1220 to transition from high to low.

It will be appreciated that the present invention is not directed toward the function of arbiters, nor does the present invention depend on any method for accomplishing arbitration among subsystems.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A method for determining the status of a resource of a digital system, wherein a first subsystem operating in synchronism with a first clock writes data to said resource, wherein a second subsystem operating in synchronism with a second clock reads data from said resource, said second clock being asynchronous with respect to said first clock, said resource being unavailable for writing additional data from said first subsystem until previously written data is read from said resource by said second subsystem, said method comprising the steps of:

generating a first quantity representing a number of write accesses to said resource made by said first subsystem, said first quantity generated in synchronism with said first clock;

generating a second quantity representing a number of read accesses to said resource made by said second subsystem, said second quantity generated in synchronism with said second clock;

synchronizing said first quantity with said second clock to generate a third quantity;

synchronizing said second quantity with said first clock to generate a fourth quantity;

comparing said first quantity to said fourth quantity to generate a first resource-available signal for said first subsystem, said first resource-available signal being active when said first quantity is equal to said fourth quantity, said first resource-available signal generated in synchronism with said first clock; and comparing said second quantity and said third quantity to generate a second resource-available signal for said second subsystem, said second resource-available signal being active when said second quantity is different from said third quantity, said second resource-available signal generated in synchronism with said second clock.

2. The method as defined in claim 1, wherein said first quantity, said second quantity, said third quantity and said fourth quantity represent a value of either zero or one, said value changing from one to zero or from zero to one when incremented, wherein said first resource-available signal is generated by exclusive-ORing said first quantity to said fourth quantity, and wherein said second resource-available signal is generated by exclusive-ORing said second quantity and said third quantity.

3. A method for determining the status of a resource of a digital system, wherein a first subsystem operating in synchronism with a first clock writes data to said resource, wherein a second subsystem operating in synchronism with a second clock reads data from said resource, said second clock being asynchronous with respect to said first clock, said resource being unavailable for writing additional data from said first subsystem until previously written data is read from said resource by said second subsystem, wherein a third subsystem of said digital system operates in synchronism with a third clock, said third clock being asynchronous with said first clock and said second clock, wherein said third subsystem writes data to said resource, said resource being unavailable for writing additional data from said third subsystem until previously written data is read from said resource by said second subsystem, said method comprising the steps of:

generating a first quantity representing a number of write accesses to said resource made by said first subsystem, said first quantity generated in synchronism with said first clock;

generating a second quantity representing a number of read accesses to said resource made by said second subsystem, said second quantity generated in synchronism with said second clock;

synchronizing said first quantity with said second clock to generate a third quantity;

synchronizing said second quantity with said first clock to generate a fourth quantity;

generating a fifth quantity representing a number of write accesses to said resource made by said third subsystem, said fifth quantity generated in synchronism with said third clock;

synchronizing said first quantity with said third clock to generate a sixth quantity;

synchronizing said second quantity with said third clock to generate a seventh quantity;

synchronizing said fifth quantity with said first clock to generate an eighth quantity;

synchronizing said fifth quantity with said second clock to generate a ninth quantity;

generating a first resource-available signal by comparing a sum of said first quantity and said eighth quantity to said fourth quantity, said first resource-available signal being active when said sum of said first quantity and said eighth quantity is equal to said fourth quantity, said first resource-available signal generated in synchronism with said first clock;

generating a second resource-available signal by comparing a sum of said third quantity and said ninth quantity to said second quantity, said second resource-available signal being active when said sum of said third quantity and said ninth quantity is different from said second quantity, said second resource-available signal generated in synchronism with said second clock; and generating a third resource-available signal by comparing a sum of said fifth quantity and said sixth quantity to said seventh quantity, said third resource-available signal being active when said sum of said fifth quantity and said sixth quantity is equal to said seventh quantity, said third resource-available signal generated in synchronism with said third clock.

4. A method for determining the status of a resource of a digital system, wherein a first subsystem operating in synchronism with a first clock writes data to said resource, wherein a second subsystem operating in synchronism with a second clock reads data from said resource, said second clock being asynchronous with respect to said first clock, wherein a third subsystem of said digital system operates in synchronism with a third clock, said third clock being asynchronous with said first clock and said second clock, wherein said third subsystem writes data to said resource, wherein a fourth subsystem of said digital system operates in synchronism with a fourth clock, said fourth clock being asynchronous with said first clock and said second clock and said third clock, wherein said fourth subsystem reads data from said resource, wherein said resource is unavailable for writing additional data from said first subsystem or said third subsystem until previously written data is read from said resource by said second subsystem or by said fourth subsystem, said method comprising the steps of:

generating a first quantity representing a number of write accesses to said resource made by said first subsystem, said first quantity generated in synchronism with said first clock;

generating a second quantity representing a number of read accesses to said resource made by said second subsystem, said second quantity generated in synchronism with said second clock;

synchronizing said first quantity with said second clock to generate a third quantity;

synchronizing said second quantity with said first clock to generate a fourth quantity;

generating a fifth quantity representing a number of write accesses to said resource made by said third subsystem, said fifth quantity generated in synchronism with said third clock;

synchronizing said first quantity with said third clock to generate a sixth quantity;

synchronizing said second quantity with said third clock to generate a seventh quantity;

synchronizing said fifth quantity with said first clock to generate an eighth quantity;

synchronizing said fifth quantity with said second clock to generate a ninth quantity;

generating a tenth quantity representing a number of read accesses to said resource made by said fourth subsystem, said tenth quantity generated in synchronism with said fourth clock;

synchronizing said first quantity with said fourth clock to generate an eleventh quantity;

synchronizing said second quantity with said fourth clock to generate a twelfth quantity;

synchronizing said fifth quantity with said fourth clock to generate a thirteenth quantity;

synchronizing said tenth quantity with said first clock to generate a fourteenth quantity;

synchronizing said tenth quantity with said second clock to generate a fifteenth quantity;

synchronizing said tenth quantity with said third clock to generate a sixteenth quantity;

generating a first resource-available signal by comparing said sum of said first quantity and said eighth quantity to a sum of said fourth quantity and said fourteenth quantity, said resource-available signal active when said sum of said first quantity and said eighth quantity is equal to said sum of said fourth quantity and said fourteenth quantity, said first resource-available signal generated in synchronism with said first clock;

generating a second resource-available signal by comparing said sum of said third quantity and said ninth quantity to a sum of said second quantity and said fifteenth quantity, said second resource-available signal active when said sum of said third quantity and said ninth quantity is different than said sum of said second quantity and said fifteenth quantity, said second resource-available signal generated in synchronism with said second clock;

generating a third resource-available signal by comparing said sum of said fifth quantity and said sixth quantity to a sum of said seventh quantity and said sixteenth quantity, said third resource-available signal active when said sum of said fifth quantity and said sixth quantity is equal to said sum of said seventh quantity and said sixteenth quantity, said third resource-available signal generated in synchronism with said third clock; and generating a fourth resource-available signal by comparing a sam of said eleventh quantity and said thirteenth quantity to a sum of said tenth quantity and said twelfth quantity, said fourth resource-available signal active when said sum of said eleventh quantity and said thirteenth quantity is equal to said sam of said tenth quantity and said twelfth quantity, said fourth resource-available signal generated in synchronism with said fourth clock.

5. A method for determining the status of a resource of a digital system, wherein a first subsystem operating in synchronism with a first clock writes data to said resource, wherein a second subsystem operating in synchronism with a second clock reads data from said resource, said second clock being asynchronous with respect to said first clock, wherein a third subsystem of said digital system operates in synchronism with a third clock, said third clock being asynchronous with said first clock and said second clock, wherein said third subsystem reads data from said resource, said resource being unavailable for writing additional data from said first subsystem until previously written data is read from said resource by said second subsystem or by said third subsystem, said method comprising the steps of:

generating a first quantity representing a number of write accesses to said resource made by said first subsystem, said first quantity generated in synchronism with said first clock;

generating a second quantity representing a number of read accesses to said resource made by said second subsystem, said second quantity generated in synchronism with said second clock;

synchronizing said first quantity with said second clock to generate a third quantity;

synchronizing said second quantity with said first clock to generate a fourth quantity;

generating a fifth quantity representing a number of read accesses to said resource made by said third subsystem, said fifth quantity generated in synchronism with said third clock;

synchronizing said first quantity with said third clock to generate a sixth quantity;

synchronizing said second quantity with said third clock to generate a seventh quantity;

synchronizing said fifth quantity with said first clock to generate an eighth quantity;

synchronizing said fifth quantity with said second clock to generate a ninth quantity;

generating a first resource-available signal by comparing said first quantity to a sum of said fourth quantity and said eighth quantity, said first resource-available signal being active when said first quantity is equal to said sum of said fourth quantity and said eighth quantity, said first resource-available signal generated in synchronism with said first clock;

generating a second resource-available signal by comparing said third quantity to a sum of said second quantity and said ninth quantity, said second resource-available signal being active when said third quantity is different from and said sum of said second quantity and said ninth quantity, said second resource-available signal generated in synchronism with said second clock; and generating a third resource-available signal by comparing said fifth quantity to a sam of said sixth quantity and said seventh quantity, said third resource-available signal being active when said fifth quantity is equal to said sam of said sixth quantity and said seventh quantity, said third resource-available signal generated in synchronism with said third clock.

6. A method for determining the status of a resource of a digital system, wherein at least one writing subsystem writes data to said resource, wherein at least one reading subsystem reads data from said resource, said resource being unavailable for writing additional data from said writing subsystems until previously written data is read from said resource by one of said reading subsystems, wherein each writing subsystem and each reading subsystem operate in synchronism with respective clocks, wherein at least one writing subsystem operates in synchronism with a first clock, wherein at least one reading subsystem operates in synchronism with a second clock, said second clock being asynchronous with said first clock, said method comprising the steps of:

generating one write quantity for each said writing subsystem, each said write quantity representing a number of write accesses to said resource made by a respective said writing subsystem, each said write quantity for each said writing subsystem generated in synchronism with said respective clock of said writing subsystem;

generating one read quantity for each said reading subsystem, each said read quantity representing a number of read accesses to said resource made by a respective said reading subsystem, each said read quantity for each said reading subsystem generated in synchronism with said respective clock of said reading subsystem;

synchronizing each write quantity with said clocks of writing subsystems and said clocks of reading subsystems;

synchronizing each read quantity with said clocks of writing subsystems and said clocks of reading subsystems;

summing said write quantities to generate a total write quantity, said summing performed independently by each said writing subsystem and each said reading subsystem;

summing said read quantities to generate a total read quantity, said summing performed independently by each said writing subsystem and each said reading subsystem;

comparing said total write quantity and said total read quantity to generate a resource-available-for-writing signal, said resource-available-for-writing signal being active when said total write quantity is equal to said total read quantity, said comparison performed independently by each said writing subsystem to generate respective resource-available-for-writing signals; and comparing said total write quantity and said total read quantity to generate a resource-available-for-reading signal, said resource-available-for-reading signal being active when said total write quantity is different from said total read quantity, said comparison performed independently by each said reading subsystem to generate respective resource-available-for-reading signals.

7. The method as defined in claim 6, wherein said write quantities and said read quantities represent a value of either zero or one, said value changing from one to zero or from zero to one when incremented, wherein said total write quantity is generated by exclusive-ORing said write quantities, wherein said total read quantity is generated by exclusive-ORing said read quantities, wherein said resource-available-for-writing signal is generated by exclusive-ORing said total write quantity and said total read quantity, wherein said resource-available-for-writing signal is generated independently by each said writing subsystem, wherein said resource-available-for-reading signal is generated by exclusive-ORing said total write quantity and said total read quantity, and wherein said resource-available-for-reading signal is generated independently by each said reading subsystem.

8. A method for determining the status of a resource of a digital system, wherein a first subsystem operating in synchronism with a first clock makes primary accesses to said resource, wherein a second subsystem operating in synchronism with a second clock makes secondary accesses to said resource, said second clock being asynchronous with respect to said first clock, wherein said resource is not available for additional said primary accesses until a said secondary access occurs, and wherein said resource is not available for said secondary accesses until a said primary access occurs, said primary accesses alternating in time with said secondary accesses, said method comprising the steps of:

generating a first quantity representing a number of said primary accesses to said resource made by said first subsystem, said first quantity generated in synchronism with said first clock;

generating a second quantity representing a number of said secondary accesses to said resource made by said second subsystem, said second quantity generated in synchronism with said second clock;

synchronizing said first quantity with said second clock to generate a third quantity;

synchronizing said second quantity with said first clock to generate a fourth quantity;

comparing said first quantity to said fourth quantity to generate a first resource-available signal for said first subsystem, said first resource-available signal being active when said first quantity is equal to said fourth quantity, said first resource-available signal generated in synchronism with said first clock; and comparing said second quantity and said third quantity to generate a second resource-available signal for said second subsystem, said second resource-available signal being active when said second quantity is different from said third quantity, said second resource-available signal generated in synchronism with said second clock.

9. An apparatus which determines the status of a resource, wherein a writing subsystem sends a write signal to said resource, wherein a reading subsystem sends a read signal to said resource, wherein said writing subsystem operates in synchronism with a first clock, wherein said reading subsystem operates in synchronism with a second clock, said second clock being asynchronous to said first clock, said apparatus comprising:

a first semaphore element which generates a first update signal having a first logic state and a second logic state, said first semaphore element responsive to said write signal to change the logic state of said first update signal in synchronism with said first clock each time said writing subsystem writes data to said resource;

a second semaphore element which generates a second update signal having a first logic state and a second logic state, said second semaphore element responsive to said read signal to change the logic state of said second update signal in synchronism with said second clock each time said reading subsystem reads data from said resource;

a first synchronization element which synchronizes said first update signal with said second clock to generate a first synchronized update signal;

a second synchronization element which synchronizes said second update signal with said first clock to generate a second synchronized update signal;

a first test element which generates a first test output signal having a first logic state and a second logic state, said first test element generating said first test output signal at said first logic state when said first update signal is equal to said second synchronized update signal, said first test element generating said first test output signal at said second logic state when said first update signal is different from said second synchronized update signal; and a second test element which generates a second test output signal having a first logic state and a second logic state, said second test element generating said second test output signal at said first logic state when said first synchronized update signal is equal to said second update signal, said second test element generating said second test output signal at said second logic state when said first synchronized update signal is different from said second update signal.

10. The apparatus as defined in claim 9, wherein:

said first semaphore comprises a first exclusive-OR gate and a first D flip-flop, said first exclusive-OR gate having a first output, said first output connected as an input into said first D flip-flop, said first D flip-flop having a second output, said second output connected as an input into said first exclusive-OR gate; and said second semaphore comprises a second exclusive-OR gate and a second D flip-flop, said second exclusive-OR gate having a third output, said third output connected as an input into said second D flip-flop, said second D flip-flop having a fourth output, said fourth output connected as an input into said second exclusive-OR gate.

11. The apparatus as defined in claim 9, wherein said first synchronization element comprises two latched D flip-flops, and wherein said second synchronization element comprises two latched D flip-flops.

12. The apparatus as defined in claim 9, wherein said first test element comprises an exclusive-OR gate, and wherein said second test element comprises an exclusive-OR gate.

13. An apparatus for determining the status of a resource of a digital system, wherein a first subsystem operating in synchronism with a first clock writes data to said resource, wherein a second subsystem operating in synchronism with a second clock reads data from said resource, said second clock being asynchronous with respect to said first clock, said resource being unavailable for writing additional data from said first subsystem until previously written data is read from said resource by said second subsystem, said apparatus comprising:

means for generating a first quantity representing a number of write accesses to said resource made by said first subsystem, said first quantity generated in synchronism with said first clock;

means for generating a second quantity representing a number of read accesses to said resource made by said second subsystem, said second quantity generated in synchronism with said second clock;

means for synchronizing said first quantity with said second clock to generate a third quantity;

means for synchronizing said second quantity with said first clock to generate a fourth quantity;

means for comparing said first quantity to said fourth quantity to generate a first resource-available signal for said first subsystem, said first resource-available signal being active when said first quantity is equal to said fourth quantity, said first resource-available signal generated in synchronism with said first clock; and means for comparing said second quantity and said third quantity to generate a second resource-available signal for said second subsystem, said second resource-available signal being active when said second quantity is different from said third quantity, said second resource-available signal generated in synchronism with said second clock.

* * * * *

UNITED STATES PATENT AND TRADEMARK OFFICE
CERTIFICATE OF CORRECTION

PATENT NO. : 5,729,765
DATED : March 17, 1998
INVENTOR(S) : Marco Y.C. Chang

It is certified that error appears in the above-identified patent and that said Letters Patent is hereby corrected as shown below:

Column 37,
Line 34, change "a sam of" to -- a sum of --.
Line 38, change "said sam of" to -- said sum of --.

Column 38,
Line 28, change "a sam of" to -- a sum of --.
Line 31, change "sam of" to -- sum of --.

Column 39,
Lines 13 and 14, delete the paragraph formatting between "total" on line 13 and "read" on line 14 so that lines 14-16 are part of the paragraph beginning at line 9

Signed and Sealed this

Twenty-second Day of October, 2002

*Attest:*

JAMES E. ROGAN
*Attesting Officer*   *Director of the United States Patent and Trademark Office*